United States Patent
Mizuno et al.

(10) Patent No.: US 10,829,410 B2
(45) Date of Patent: Nov. 10, 2020

(54) ANTIFOG LAMINATE, ARTICLE, MANUFACTURING METHOD THEREOF, AND ANTI-FOG METHOD

(71) Applicant: Dexerials Corporation, Tokyo (JP)

(72) Inventors: Mikihisa Mizuno, Tokyo (JP); Shogo Sakamoto, Tokyo (JP); Shinobu Hara, Tokyo (JP); Ryo Suzuki, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 97 days.

(21) Appl. No.: 15/765,419

(22) PCT Filed: Oct. 4, 2016

(86) PCT No.: PCT/JP2016/079438
§ 371 (c)(1),
(2) Date: Apr. 2, 2018

(87) PCT Pub. No.: WO2017/073262
PCT Pub. Date: May 4, 2017

(65) Prior Publication Data
US 2018/0305249 A1 Oct. 25, 2018

(30) Foreign Application Priority Data

Oct. 27, 2015 (JP) .................... 2015-211305
Aug. 30, 2016 (JP) .................... 2016-168222

(51) Int. Cl.
| | | |
|---|---|---|
| B32B 27/08 | (2006.01) | |
| B32B 27/26 | (2006.01) | |
| B32B 27/00 | (2006.01) | |
| B32B 17/06 | (2006.01) | |
| C03C 17/32 | (2006.01) | |
| B29C 45/14 | (2006.01) | |
| C08F 220/34 | (2006.01) | |
| C03C 17/34 | (2006.01) | |
| B29C 45/40 | (2006.01) | |
| B32B 17/10 | (2006.01) | |
| B32B 37/14 | (2006.01) | |

(52) U.S. Cl.
CPC .... C03C 17/3405 (2013.01); B29C 45/14811 (2013.01); B32B 27/00 (2013.01); C03C 17/32 (2013.01); *B29C 45/401* (2013.01); *B29C 2045/14286* (2013.01); *B32B 17/10706* (2013.01); *B32B 17/10743* (2013.01); *B32B 17/10807* (2013.01); *B32B 27/08* (2013.01); *B32B 27/26* (2013.01); *B32B 37/144* (2013.01); *B32B 2307/51* (2013.01); *B32B 2307/728* (2013.01); *B32B 2307/73* (2013.01); *C03C 2217/75* (2013.01); *C03C 2217/76* (2013.01)

(58) Field of Classification Search
None
See application file for complete search history.

(56) References Cited

U.S. PATENT DOCUMENTS

| | | |
|---|---|---|
| 5,739,181 A | 4/1998 | Khudyakov et al. |
| 5,958,598 A | 9/1999 | Khudyakov et al. |
| 2007/0218292 A1 | 9/2007 | Shimada et al. |
| 2014/0205801 A1* | 7/2014 | Iwata .............. B08B 17/06 428/141 |
| 2017/0056834 A1* | 3/2017 | Bhushan .......... C09D 139/04 |
| 2018/0050513 A1* | 2/2018 | Mizuno ............ B29C 45/16 |
| 2018/0118907 A1* | 5/2018 | Sakamoto ........ B32B 15/18 |

FOREIGN PATENT DOCUMENTS

| | | |
|---|---|---|
| EP | 399441 | 11/1990 |
| JP | 03-215589 | 9/1991 |
| JP | 10-060309 | 3/1998 |
| JP | 3760669 | 1/2006 |
| JP | 2009-114248 | 5/2006 |
| JP | 2007-246817 | 9/2007 |
| KR | 10-2002-0091972 | 12/2002 |

OTHER PUBLICATIONS

Korean Patent Office, Office Action issued in corresponding Korean Application No. 10-2018-7012995, dated Jun. 14, 2019.
European Patent Office, European Search Report issued in corresponding European Patent Application No. 16859499.2, dated Aug. 28, 2019.

* cited by examiner

*Primary Examiner* — Sheeba Ahmed
(74) *Attorney, Agent, or Firm* — Carmody Torrance Sandak & Hennessey LLP

(57) ABSTRACT

An anti-fogging laminate including: a substrate; and an anti-fogging layer on the substrate where a surface of the anti-fogging layer is flat, wherein the anti-fogging layer includes a hydrophilic molecular structure; and wherein the anti-fogging layer has an elastic recovery of 90% or more, a coefficient of dynamic friction of 0.40 or less, and an average thickness of 4 μm or more.

13 Claims, 4 Drawing Sheets

ANTIFOG LAMINATE, ARTICLE, MANUFACTURING METHOD THEREOF, AND ANTI-FOG METHOD

ANTIFOG LAMINATE, ARTICLE, MANUFACTURING METHOD THEREOF, AND ANTI-FOG METHOD

TECHNICAL FIELD

The present invention relates to an anti-fogging laminate, a product using the anti-fogging laminate, a method for manufacturing the product, and an anti-fogging method using the anti-fogging laminate. The anti-fogging laminate has a durable anti-fogging property and can be used in a wide variety of fields (building use, industrial use, automobile use, optical use, solar battery panels, etc.).

BACKGROUND ART

To decorate and protect the surfaces of products, resin films and glass and the like are attached to the surfaces.

However, the resin films and glass decorating and protecting the surfaces of products sometimes get fogged to reduce visibility and good appearance of the products.

To prevent reduction of visibility and good appearance of products, an anti-fogging treatment is applied to the resin films and glass.

For example, there has been proposed an electron ray curable hard coat sheet having an anti-fogging property and an anti-fouling property and having a certain composition (see, for example, PTL 1).

Usually, products which need to have an anti-fogging property such as mirrors, glass windows, and glasses are wiped with, for example, pieces of cloth in order to remove stains such as fingerprints and dust. As a result, the anti-fogging property is deteriorated through repeated wiping, which is problematic.

CITATION LIST

Patent Literature

PTL 1 Japanese Patent No. 3760669

SUMMARY OF INVENTION

Technical Problem

An object of the present invention is to solve the aforementioned problems in the art and attain the following object. That is, an object of the present invention is to provide an anti-fogging laminate having a durable anti-fogging property, a product using the anti-fogging laminate, a method for manufacturing the product, and an anti-fogging method using the anti-fogging laminate.

Solution to Problem

Means for solving the problems are as follows. That is,
<1> An anti-fogging laminate including:
a substrate; and
an anti-fogging layer on the substrate where a surface of the anti-fogging layer is flat,
wherein the anti-fogging layer includes a hydrophilic molecular structure; and
wherein the anti-fogging layer has an elastic recovery of 90% or more, a coefficient of dynamic friction of 0.40 or less, and an average thickness of 4 μm or more.
<2> The anti-fogging laminate according to <1>, wherein the surface of the anti-fogging layer has a pure water contact angle of 70° or more and a hexadecane contact angle of 35° or more.
<3> The anti-fogging laminate according to <1> or <2>, wherein the anti-fogging layer includes a hydrophobic molecular structure.
<4> The anti-fogging laminate according to any one of <1> to <3>, wherein the anti-fogging laminate includes an anchor layer disposed between the substrate and the anti-fogging layer.
<5> The anti-fogging laminate according to <4>, wherein the substrate is a substrate made of glass.
<6> The anti-fogging laminate according to <4> or <5>, wherein the anchor layer has an average thickness of 0.5 μm to 5 μm.
<7> The anti-fogging laminate according to any one of <4> to <6>, wherein the anchor layer is a cured product of an active energy ray curable resin composition,
wherein an active energy curable component in the active energy ray curable resin composition includes 65% by mass or more of urethane (meth)acrylate and includes at least one of an active energy curable component having a hydroxyl group and an active energy curable component having an ethylene oxide structure; and
wherein the active energy ray curable resin composition includes a photopolymerization initiator.
<8> The anti-fogging laminate according to <7>, wherein the active energy curable component in the active energy ray curable resin composition includes 15% by mass or more of at least one of the active energy curable component having a hydroxyl group and the active energy curable component having an ethylene oxide structure.
<9> A product including:
the anti-fogging laminate according to any one of <1> to <8> on a surface thereof.
<10> A method for manufacturing the product according to <9>, the method including:
heating the anti-fogging laminate; and
molding the anti-fogging laminate heated into a desired shape.
<11> The method for manufacturing the product according to <10>,
wherein the heating is performed by infrared heating.
<12> An anti-fogging method including:
laminating the anti-fogging laminate according to any one of <1> to <8> on a surface of a product to thereby prevent the product from fogging.
<13> An anti-fogging method including:
throwing water having a temperature of an ordinary temperature or higher on the anti-fogging layer, which has been fogged with steam, of the anti-fogging laminate according to any one of <1> to <8> to thereby prevent the anti-fogging layer from fogging.

Advantageous Effects of the Invention

According to the present invention, the problems in the art are overcome and the object of the present invention can be attained. In addition, it is possible to provide an anti-fogging laminate having a durable anti-fogging property, a product using the anti-fogging laminate, a method for manufacturing the product, and an anti-fogging method using the anti-fogging laminate.

DESCRIPTION OF EMBODIMENTS (Anti-Fogging Laminate)

Figure 1A:
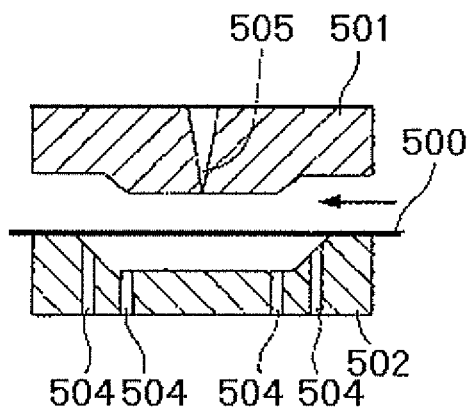
FIG. 1A is a process drawing for describing an example of manufacturing a product of the present invention by in-mold molding.

An anti-fogging laminate of the present invention includes at least a substrate and an anti-fogging layer, preferably includes an anchor layer, and further includes other members as necessary.

<Substrate>

The substrate is not particularly limited and can be appropriately selected depending upon the purpose. Examples thereof include a substrate made of resin and a substrate made of inorganics.

<<Substrate Made of Inorganics>>

Examples of the substrate made of inorganics include a substrate made of glass, a substrate made of quartz, and a substrate made of sapphire.

The substrate made of glass is not particularly limited and can be appropriately selected depending upon the purpose. Examples thereof include silica glass (silicate glass), soda-lime glass, and potash glass.

The substrate made of glass may also be, for example, tempered glass, laminated glass, and heat-resistant glass.

The substrate made of glass may be those used in any application such as windowpanes for automobiles, windowpanes for buildings, lens, mirrors, and goggles.

The substrate made of glass has usually a plate-like shape, but may have any shape such as a sheet-like shape and a curved shape.

<<Substrate Made of Resin>>

The material for the substrate made of a resin is not particularly limited and can be appropriately selected depending upon the purpose. Examples of the material include triacetylcellulose (TAC), polyester (TPEE), polyethylene terephthalate (PET), polyethylenenaphthalate (PEN), polyimide (PI), polyamide (PA), aramid, polyethylene (PE), polyacrylate, polyethersulfone, polysulfone, polypropylene (PP), polystyrene, diacetylcellulose, poly(vinyl chloride), an acrylic resin (PMMA), polycarbonate (PC), an epoxy resin, a urea resin, a urethane resin, a melamine resin, a phenolic resin, an acrylonitrile-butadiene-styrene copolymer, a cycloolefin polymer (COP), a cycloolefin copolymer (COC), a PC/PMMA laminate and a rubber-added PMMA.

The substrate preferably has transparency.

The form of the substrate, which is not particularly limited and can be appropriately selected depending upon the purpose, is preferably a film form.

If the substrate is a film, the average thickness of the substrate, which is not particularly limited and can be appropriately selected depending upon the purpose, is preferably 5 μm to 1,000 μm and more preferably 50 μm to 500 μm.

On the surface of the substrate, letters, patterns and images, etc. may be printed.

On the surface of the substrate, a binder layer may be provided in order to increase close adhesiveness between the substrate and a molding material in forming the anti-fogging laminate in a molding process or in order to protect the letters, patterns, and images from flow resistive pressure of the molding material during a molding process. As the material for the binder layer, binders made of acryl, urethane, polyester, polyamide, ethylene butyl alcohol, and an ethylene-vinyl acetate copolymer; and adhesives can be used. Note that the binder layer may be formed of two layers or more. As the binder to be used, a binder having heat-sensitivity and pressure-sensitivity suitable for a molding material can be selected.

A surface of the substrate opposite to the anti-fogging layer may have a wrinkle pattern. Thus, a blocking is prevented when a plurality of the anti-fogging laminates is laminated, a handling ability in subsequent steps is improved, and products may be efficiently manufactured.

The wrinkle pattern may be formed by, for example, surface texturing.

Here, the blocking means that, when a plurality of sheets is laminated, the sheets are difficult to peel from each other.

<Anti-Fogging Layer>

The anti-fogging layer has an elastic recovery of 90% or more.

The anti-fogging layer has a coefficient of dynamic friction of 0.40 or less.

The anti-fogging layer has an average thickness of 4 μm or more.

The anti-fogging layer includes a hydrophilic molecular structure. The anti-fogging layer preferably further includes a hydrophobic molecular structure.

A surface of the anti-fogging layer has a pure water contact angle of 70° or more.

The surface of the anti-fogging layer has a hexadecane contact angle of 35° or more.

The anti-fogging layer can achieve a durable anti-fogging property by having all of the elastic recovery of 90% or more, the coefficient of dynamic friction of 0.40 or less, and the average thickness of 4 μm or more.

That is, if the anti-fogging layer does not meet one or more of the following conditions (1) to (3), the durable anti-fogging property is not able to be achieved:
(1) the elastic recovery is 90% or more;
(2) the coefficient of dynamic friction is 0.40 or less; and
(3) the average thickness is 4 µm or more.

When the above conditions (1) to (3) are met, even if the anti-fogging layer is deformed by pressure applied upon wiping, the anti-fogging layer has a high restoring property upon removal of the pressure.

When the above condition (2) is met, physical pressure applied to the anti-fogging layer by wiping can be kept at a low level.

The anti-fogging layer attains the durable anti-fogging property through their combined action.

Here, the phrase "durable anti-fogging property" means that the anti-fogging property is maintained even after repeatedly wiping stains on the surface of the anti-fogging layer with, for example, pieces of clothes.

<<Elastic Recovery>>

The elastic recovery is an index as described below:

An index representing to what extent an evaluated object is recovered by elasticity of the evaluated object itself relative to a total deformation quantity when the evaluated object is deformed in a process of (i) applying stress for a certain period of time, (ii) keeping for a certain period of time, and (iii) releasing the stress at a certain rate.

The elastic recovery is determined by a method described below.

A durometer PICODENTOR HM500 (manufactured by Fischer Instruments) provided with a diamond pyramid penetrator (face angle: 136°) is used to apply the predetermined pressure at a certain loading rate (0.050 mN/µm²·sec in the case of the pressure of 1.0 mN/µm²) for 20 sec at 25° C. and then unload the pressure to 0 at a certain unloading rate (0.050 mN/µm²·sec in the case of the pressure of 1.0 mN/µm²) for 20 sec. Based on a hysteresis curve between load and deformation quantity during this period, plastic deformation workload (Wplast) and elastic deformation workload (Welast) are determined to thereby calculate the elastic recovery (%) at the predetermined pressure according to the following equation:

Elastic recovery (%)=[$W$elast/($W$plast+$W$elast)]×100

An elastic recovery property is evaluated by generating the hysteresis curve at the pressure of 1.0 mN/µm² and calculating the elastic recovery.

The elastic recovery of the anti-fogging layer is 90% or more, preferably 93% or more, more preferably 95% or more, particularly preferably 98% or more.

Note that, the upper limit of the elastic recovery of the anti-fogging layer is 100%.

<<Coefficient of Dynamic Friction>>

The coefficient of dynamic friction is determined as described below.

The coefficient of dynamic friction is measured using TRIBOSTER TS501 (trade name; manufactured by Kyowa Interface Science Co., Ltd.). BEMCOT (registered trademark) M-3II (trade name; manufactured by Asahi Kasei Corporation) is adhered to a surface contactor with a piece of double sided tape. The coefficient of dynamic friction was measured at randomly selected 12 points at a measuring load of 50 g/cm², a measuring rate of 1.7 mm/s, and a measuring distance of 20 mm, and the average value thereof is defined as the coefficient of dynamic friction.

The coefficient of dynamic friction of the anti-fogging layer is 0.40 or less, preferably 0.37 or less, more preferably 0.30 or less.

The lower limit of the coefficient of dynamic friction the anti-fogging layer is not particularly limited and can be appropriately selected depending upon the purpose, but the coefficient of dynamic friction of the anti-fogging layer is preferably, for example, 0.10 or more.

<<Average Thickness>>

The average thickness is measured as described below.

The thickness of the anti-fogging layer is measured by observing a cross-section of the anti-fogging laminate with an electron emission type scanning electron microscope S-4700 (trade name; manufactured by Hitachi High-Technologies Corporation). The thickness is measured at randomly selected 5 points, and the average value thereof is defined as the average thickness.

The average thickness of the anti-fogging layer is 4 µm or more, preferably 5 µm or more.

The average thickness of the anti-fogging layer cannot be too thick because, even if the anti-fogging layer is thick, the high restoring property when the anti-fogging layer is deformed by pressure applied upon wiping is not adversely affected. Therefore, the average thickness is not particularly limited and can be appropriately selected depending upon the purpose. The upper limit of the average thickness of the anti-fogging layer is not particularly limited and can be appropriately selected to depending upon the purpose. The average thickness may be, for example, 15 µm or less, 30 µm or less, and 100 µm or less.

The anti-fogging layer is disposed on the substrate.

The surface of the anti-fogging layer is flat. Here, the phrase "the surface is flat" means that the surface does not have intentionally formed convex portions or concave portions. For example, regarding the anti-fogging laminate, when the anti-fogging layer is formed (the cured product is formed), fine convex portions or concave portions achieved through a physical processing are not formed on the surface.

When the surface of the anti-fogging layer does not have fine convex portions or concave portions, aqueous stains and/or oily stains (e.g., ink of felt pens, fingerprints, sweat, and cosmetics such as foundation cosmetics and UV protectors) hardly adhere to the surface of the anti-fogging layer. In addition, even if these stains adhere thereto, the stains can easily be removed with a tissue.

<<Hydrophilic Molecular Structure>>

The hydrophilic molecular structure is not particularly limited and can be appropriately selected depending upon the purpose, as long as it is a molecular structure which is hydrophilic. Examples thereof include a hydrophilic organic molecular structure. Specific examples thereof include a polyoxyalkyl group and a polyoxyalkylene group. The hydrophilic molecular structure can be introduced into the anti-fogging layer by, for example, using a hydrophilic monomer described below when the anti-fogging layer is produced.

<<Hydrophobic Molecular Structure>>

The hydrophobic molecular structure is not particularly limited and can be appropriately selected depending upon the purpose, as long as it is a molecular structure which is hydrophobic. Examples thereof include a hydrophobic organic molecular structure. Specific examples thereof include a fluoroalkyl group, a fluoroalkylether group, and a dimethyl siloxane group. The hydrophobic molecular structure can be introduced into the anti-fogging layer by, for example, using a hydrophobic monomer described below when the anti-fogging layer is produced.

<<Pure Water Contact Angle>>

The pure water contact angle of the surface of the anti-fogging layer is preferably 70° or more, more preferably 90° or more, and particularly preferably 100° or more. The upper limit of the pure water contact angle, which is not particularly limited and can be appropriately selected depending upon the purpose, is, for example, 170°.

The pure water contact angle is measured using a contact angle meter, PCA-1 (manufactured by Kyowa Interface Science Co., Ltd.) in the following conditions. Distillation water is placed in a plastic syringe. To the tip of the syringe, a stainless steel needle is attached. The distillation water is allowed to drip on an evaluation surface (the anti-fogging layer surface).

The amount of water to be dripped: 2 µL
The measurement temperature: 25° C.

The contact angle 5 seconds after dripping of water is measured at randomly selected 10 points on the surface of the anti-fogging layer, and the average value thereof is defined as the pure water contact angle.

<<Hexadecane Contact Angle>>

The hexadecane contact angle of the surface of the anti-fogging layer is preferably 35° or more, more preferably 40° or more, and particularly preferably 60° or more. The upper limit of the hexadecane contact angle, which is not particularly limited and can be appropriately selected depending upon the purpose, is, for example, 150°.

The hexadecane contact angle is measured using a contact angle meter, PCA-1 (manufactured by Kyowa Interface Science Co., Ltd.) in the following conditions. Hexadecane is placed in a plastic syringe. To the tip of the syringe, a TEFLON coated stainless steel needle is attached. The hexadecane is allowed to drip on an evaluation surface (the anti-fogging layer surface).

The amount of hexadecane to be dripped: 1 µL
The measurement temperature: 25° C.

The contact angle 20 seconds after dripping of hexadecane is measured at randomly selected 10 points on the surface of the anti-fogging layer, and the average value thereof is defined as the hexadecane contact angle.

The pure water contact angle falling within the aforementioned preferable range and the hexadecane contact angle falling within the aforementioned preferable range make it possible to prevent the stains from permeation into the bottom layer of the bulk even when aqueous stains and/or oily stains (e.g., ink of felt pens, finger prints, sweat, and cosmetics such as foundation cosmetics and UV protectors) adhere to the surface of the anti-fogging layer. Therefore, the anti-fogging layer is also excellent in an anti-fouling property in addition to the anti-fogging property.

Note that, the anti-fogging laminate having also the anti-fouling property may be referred to as an anti-fogging and anti-fouling laminate. The anti-fogging layer having also the anti-fouling property may be referred to as an anti-fogging and anti-fouling layer.

<<Active Energy Ray Curable Resin Composition>>

The anti-fogging layer is, for example, a cured product obtained by curing an active energy ray curable resin composition through an active energy ray.

The active energy ray curable resin composition includes at least a hydrophilic monomer having a radically polymerizable unsaturated group (hereinafter, may be referred to as "hydrophilic monomer") and a photopolymerization initiator, preferably includes a hydrophobic monomer having a radically polymerizable unsaturated group (hereinafter, may be referred to as "hydrophobic monomer"). Moreover, the active energy ray curable resin composition includes other components as necessary.

—Hydrophilic Monomer—

Examples of the hydrophilic monomer having a radically polymerizable unsaturated group include a (meth)acrylate including a polyoxyalkylene chain, a quaternary ammonium salt-containing (meth)acrylate, a tertiary amino group-containing (meth)acrylate, a sulfonic acid group-containing monomer, a carboxylic acid group-containing monomer, a phosphoric acid group-containing monomer and a phosphonic acid group-containing monomer. These may be a monofunctional monomer or a multifunctional monomer.

Examples of the polyoxyalkylene chain include a polyoxyethylene chain and a polyoxypropylene chain. Among them, a polyoxyethylene chain is preferable in terms of excellence in hydrophilicity.

Examples of the hydrophilic monomer include mono- or poly-acrylates or mono- or poly-methacrylates obtained by the reaction between a polyhydric alcohol (polyol or polyhydroxy-containing compound) and a compound selected from the group consisting of an acrylic acid, a methacrylic acid, and derivatives thereof. Examples of the polyhydric alcohol include divalent alcohols, trivalent alcohols and quadrivalent or larger valent alcohols. Examples of the divalent alcohols include ethylene glycol, diethylene glycol, triethylene glycol, tetraethylene glycol, polyethylene glycol having a number average molecular weight of 300 to 1,000, propylene glycol, dipropylene glycol, 1,3-propanediol, 1,4-butanediol, 1,5-pentanediol, 1,6-hexanediol, neopentyl glycol, 2-ethyl-1,3-hexanediol, 2,2'-thiodiethanol and 1,4-cyclohexanedimethanol. Examples of the trivalent alcohols include trimethylolethane, trimethylolpropane, pentaglycerol, glycerol, 1,2,4-butanetriol and 1,2,6-hexanetriol. Examples of the quadrivalent or larger valent alcohols include pentaerythritol, diglycerol, and dipentaerythritol.

Examples of the (meth)acrylate including a polyoxyalkylene chain include polyethylene glycol (meth)acrylate, polypropylene glycol (meth)acrylate, ethoxylated glycerin (meth)acrylate, ethoxylated pentaerythritol tetra(meth)acrylate, ethoxylated trimethylolpropane tri(meth)acrylate, and ethoxylated glycerin tri(meth)acrylate.

Of them, ethoxylated trimethylolpropane tri(meth)acrylate (e.g., SR415 and SR9035 manufactured by Sartomer Co.), ethoxylated(15) trimethylolpropane tri(meth)acrylate, and ethoxylated glycerin tri(meth)acrylate are preferable because appropriate hardness and hydrophilicity of the anti-fogging layer can be satisfied.

Examples of the quaternary ammonium salt-containing (meth)acrylate include (meth)acryloyloxyethyltrimethylammonium chloride, (meth)acryloyloxyethyldimethylbenzylammonium chloride, (meth)acryloyloxyethyldimethylglycidylammonium chloride, (meth)acryloyloxyethyltrimethylammoniummethyl sulfate, (meth)acryloyloxydimethylethylammoniumethyl sulfate, (meth)acryloyloxyethyltrimethylammonium-p-toluene sulfonate, (meth)acrylamidepropyltrimethylammonium chloride, (meth)acrylamidepropyldimethylbenzylammonium chloride, (meth)acrylamidepropyldimethylglycidylammonium chloride, (meth)acrylamidepropyltrimethylammoniummethyl sulfate, (meth)acrylamidepropyldimethylethylammoniumethyl sulfate, and (meth)acrylamidepropyltrimethylammonium-p-toluene sulfonate.

Examples of the tertiary amino group-containing (meth)acrylate include N,N-dimethylaminoethyl(meth)acrylate, N,N-dimethylaminopropyl(meth)acrylamide, diethylaminopropyl(meth)acrylamide, 1,2,2,6,6-pentamethylpiperidyl (meth)acrylate and 2,2,6,6-tetramethylpiperidyl(meth)acrylate.

Examples of the sulfonic acid group-containing monomer include vinylsulfonic acid, allylsulfonic acid, vinyltoluenesulfonic acid, styrenesulfonic acid and sulfonic acid group-containing (meth)acrylate. Examples of the sulfonic acid group-containing (meth)acrylate include sulfoethyl (meth)acrylate, sulfopropyl (meth)acrylate, 2-acrylamide-2-methylpropanesulfonic acid and terminal sulfonic acid modified polyethylene glycol mono(meth)acrylate. These may form salts. Examples of the salts include a sodium salt, a potassium salt, and an ammonium salt.

Examples of the carboxylic acid group-containing monomer include acrylic acid and methacrylic acid.

Examples of the phosphoric acid group-containing monomer include (meth)acrylate having a phosphoric acid ester.

The hydrophilic monomer is preferably a multifunctional hydrophilic monomer.

The molecular weight of the hydrophilic monomer, which is not particularly limited and can be appropriately selected depending upon the purpose, is preferably 200 or more.

The content of the hydrophilic monomer in the active energy ray curable resin composition is 60% by mass or more, preferably 60% by mass to 99.9% by mass, more preferably 63% by mass to 95% by mass, particularly preferably 65% by mass to 90% by mass. Note that, when the active energy ray curable resin composition includes a volatile component (organic solvent etc.), the aforementioned content means a content relative to a non-volatile component in the active energy ray curable resin composition.

—Hydrophobic Monomer—

Examples of the hydrophobic monomer having a radically polymerizable unsaturated group include monomers including, for example, a radically polymerizable unsaturated group and at least one of fluorine and silicon. Specific examples of such monomers include (meth)acrylates including at least one of fluorine and silicon such as fluorine-containing (meth)acrylates and silicone (meth)acrylates. More specific examples thereof include (meth)acrylates including a fluoroalkyl group, (meth)acrylates including a fluoroalkyl ether group, and (meth)acrylates including a dimethylsiloxane group.

The hydrophobic monomer is preferably compatible with the hydrophilic monomer.

In the present invention, the (meth)acrylate refers to an acrylate or a methacrylate. The same applies to (meth)acryloyl and (meth)acryl.

The hydrophobic monomer may be a commercially available product.

Examples of commercially available products of the fluorine-containing (meth)acrylates include KY-1200 series manufactured by Shin-Etsu Chemical Co., Ltd., MEGAFACE RS series manufactured by DIC CORPORATION, and OPTOOL DAC manufactured by DAIKIN INDUSTRIES, LTD.

Examples of commercially available products of the silicone (meth)acrylates include X-22-164 series manufactured by Shin-Etsu Chemical Co., Ltd. and TEGO Rad series manufactured by Evonik Co.

The content of the hydrophobic monomer in the active energy ray curable resin composition, which is not particularly limited and can be appropriately selected depending upon the purpose, is preferably 0.1% by mass to 10% by mass, more preferably 1.0% by mass to 5.0% by mass. When the anti-fogging layer includes a large amount of reaction products of the hydrophobic monomer, this may lead to a decreased anti-fogging property to exhalation. Note that, when the active energy ray curable resin composition includes a volatile component (organic solvent etc.), the aforementioned content means a content relative to a non-volatile component in the active energy ray curable resin composition.

—Photopolymerization Initiator—

Examples of the photopolymerization initiator include a photoradical polymerization initiator, a photo-acid generating agent, a bisazido compound, hexamethoxymethylmelamine and tetramethoxy glycoluril.

Examples of the photoradical polymerization initiator, which is not particularly limited and can be appropriately selected depending upon the purpose, include ethoxyphenyl (2,4,6-trimethylbenzoyl)phosphine oxide, bis(2,6-dimethylbenzoyl)-2,4,4-trimethylpentylphosphine oxide, bis(2,4,6-trimethylbenzoyl)-2,4,4-trimethylpentylphosphine oxide, bis(2,6-dichlorobenzoyl)-2,4,4-trimethylpentylphosphine oxide, 1-phenyl-2-hydroxy-2-methylpropan-1-one, 1-hydroxycyclohexylphenyl ketone, 1-(4-isopropylphenyl)-2-hydroxy-2-methylpropan-1-one, 1,2-diphenylethanedione and methylphenylglyoxylate.

The content of the photopolymerization initiator in the active energy ray curable resin composition, which is not particularly limited and can be appropriately selected depending upon the purpose, is preferably 0.1% by mass to 10% by mass, more preferably 0.5% by mass to 8% by mass, and particularly preferably 1% by mass to 5% by mass. Note that, when the active energy ray curable resin composition includes a volatile component (organic solvent etc.), the aforementioned content means a content relative to a non-volatile component in the active energy ray curable resin composition.

—Other Components—

Examples of the other components, which are not particularly limited and can be appropriately selected depending upon the purpose, include urethane (meth)acrylate, an isocyanuric acid group-containing (meth)acrylate, and a filler.

These are sometimes used for controlling elongation percentage and hardness, etc. of the anti-fogging layer.

Examples of the urethane (meth)acrylate, which is not particularly limited and can be appropriately selected depending upon the purpose, include an aliphatic urethane (meth)acrylate and an aromatic urethane (meth)acrylate. Of them, an aliphatic urethane (meth)acrylate is preferable.

The content of the urethane (meth)acrylate in the active energy ray curable resin composition, which is not particularly limited and can be appropriately selected depending upon the purpose, is preferably 10% by mass to 45% by mass, more preferably 15% by mass to 40% by mass, and particularly preferably 20% by mass to 35% by mass. Note that, when the active energy ray curable resin composition includes a volatile component (organic solvent etc.), the aforementioned content means a content relative to a non-volatile component in the active energy ray curable resin composition.

Examples of the filler, which is not particularly limited and can be appropriately selected depending upon the purpose, include silica, zirconia, titania, tin oxide, indium tin oxide, antimony-doped tin oxide and antimony pentoxide. Examples of the silica include solid silica and hollow silica.

The active energy ray curable resin composition is diluted with an organic solvent and put in use. Examples of the organic solvent include an aromatic solvent, an alcohol solvent, an ester solvent, a ketone solvent, a glycol ether solvent, a glycol ether ester solvent, a chlorine solvent, an ether solvent, N-methylpyrrolidone, dimethylformamide, dimethylsulfoxide and dimethylacetamide.

The active energy ray curable resin composition is cured by irradiation of an active energy ray. Examples of the active energy ray, which is not particularly limited and can be appropriately selected depending upon the purpose, include an electron beam, a UV ray, an infrared ray, a laser beam, a visible ray, ionizing radiation (X ray, an α ray, a β ray, a γ ray, etc.), a microwave and a high-frequency wave.

<Other Members>

As other members, an anchor layer, a protective layer, etc. are mentioned.

—Anchor Layer—

The anchor layer is a layer which is disposed between the substrate and the anti-fogging layer.

Disposition of the anchor layer makes it possible to improve close adhesiveness between the substrate and the anti-fogging layer.

The refractive index of the anchor layer is preferably close to the refractive index of the anti-fogging layer in order to prevent interference irregularity. For this reason, the refractive index of the anchor layer falls preferably within ±0.10 of the refractive index of the anti-fogging layer and more preferably within ±0.05. Alternatively, the refractive index of the anchor layer is preferably between the refractive index of the anti-fogging layer and the refractive index of the substrate.

The anchor layer can be formed by applying, for example, an active energy ray curable resin composition. That is, the anchor layer is, for example, a cured product obtained by curing the active energy ray curable resin composition through an active energy ray. As the active energy ray curable resin composition, for example, an active energy ray curable resin composition containing at least urethane (meth)acrylate and a photopolymerization initiator, and further containing other components as necessary is mentioned. As the urethane (meth)acrylate and the photopolymerization initiator, the same examples of the urethane (meth)acrylates and the photopolymerization initiators as described in the section where the anti-fogging layer is described, are respectively mentioned. Examples of the application method for coating, which is not particularly limited and can be appropriately selected depending upon the purpose, include wire bar coating, blade coating, spin coating, reverse roll coating, die coating, spray coating, roll coating, gravure coating, microgravure coating, lip coating, air knife coating, curtain coating, a comma coat method and a dipping method.

When the substrate is the substrate made of glass, the anti-fogging laminate preferably has the anchor layer in order to improve adhesiveness between layers. In this case, the anchor layer is preferably a cured product of the active energy ray curable resin composition. An active energy curable component in the active energy ray curable resin composition preferably includes 65% by mass or more of the urethane (meth)acrylate and includes at least one of an active energy curable component having a hydroxyl group and an active energy curable component having an ethylene oxide structure. The active energy curable component in the active energy ray curable resin composition more preferably includes 15% by mass or more of at least one of the active energy curable component having a hydroxyl group and the active energy curable component having an ethylene oxide structure.

The active energy ray curable resin composition preferably includes a photopolymerization initiator. Examples thereof include the photopolymerization initiator, which is a component of the active energy ray curable resin composition described as an exemplary component of the anti-fogging layer.

Examples of the active energy curable component having a hydroxyl group include (meth)acrylate having a hydroxyl group.

Examples of the (meth)acrylate having a hydroxyl group include hydroxyethyl (meth)acrylate and pentaerythritol tri (meth)acrylate.

Examples of the active energy curable component having an ethylene oxide structure include (meth)acrylate having an ethylene oxide structure.

Examples of the (meth)acrylate having an ethylene oxide structure include pentaerythritol ethoxy tetra(meth)acrylate and trimethylolpropane ethoxy tri(meth)acrylate.

The average thickness of the anchor layer, which is not particularly limited and can be appropriately selected depending upon the purpose, is preferably 0.01 μm to 10 μm, more preferably 0.1 μm to 5 μm, further more preferably 0.3 μm to 5 μm, particularly preferably 0.5 μm to 5 μm. The average thickness of the anchor layer falling within the aforementioned particularly preferable range makes it possible to attain an anti-fogging laminate which is excellent in adhesiveness between layers even if the substrate is the substrate made of glass.

Note that a reflectivity-reducing function and an antistatic function may be imparted to the anchor layer.

The anchor layer may include, for example, an antioxidant, an UV absorber, a photostabilizer, and an infra-red absorber for the purpose of improving durability and weather resistance.

—Protective Layer—

The protective layer is a layer to protect the surface of the anti-fogging layer (the surface where the pure water contact angle is 90° or more).

The protective layer protects the surface when the below-described product is manufactured using the anti-fogging laminate.

The protective layer is disposed on the surface of the anti-fogging resin layer.

Examples of the material for the protective layer include similar materials to those for the anchor layer.

The anti-fogging laminate is particularly suitable as a film for thermal bending, a film for in-mold forming, a film for insert molding, and a film for overlay molding.

As a method for manufacturing the anti-fogging laminate, which is not particularly limited and can be appropriately selected depending upon the purpose, a method for manufacturing the anti-fogging laminate (described later) is preferable.

<Method for Manufacturing Anti-Fogging Laminate>

The method for manufacturing the anti-fogging laminate includes at least: an uncured resin layer forming step, and an anti-fogging layer forming step; and further includes other steps as necessary.

The method for manufacturing the anti-fogging laminate is a method for manufacturing the anti-fogging laminate of the present invention.

<<Uncured Resin Layer Forming Step>>

The uncured resin layer forming step is not particularly limited and can be appropriately selected depending upon the purpose, as long as the step is a step of coating an active energy ray curable resin composition on a substrate to form an uncured resin layer.

Examples of the substrate, which is not particularly limited and can be appropriately selected depending upon the purpose, include examples of the substrate described in the section where the anti-fogging laminate of the present invention is described.

Examples of the active energy ray curable resin composition, which is not particularly limited and can be appropriately selected depending upon the purpose, include examples of the active energy ray curable resin composition described in the section where the anti-fogging layer for the anti-fogging laminate of the present invention is described.

The uncured resin layer is formed by coating the active energy ray curable resin composition on the substrate and drying the composition as necessary. The uncured resin layer may be a solid film or a film having flowability due to a curable component of low molecular weight contained in the active energy ray curable resin composition.

Examples of the application method for coating, which is not particularly limited and can be appropriately selected depending upon the purpose, include wire bar coating, blade coating, spin coating, reverse roll coating, die coating, spray coating, roll coating, gravure coating, microgravure coating, lip coating, air knife coating, curtain coating, a comma coat method and a dipping method.

The uncured resin layer remains uncured since the layer is not irradiated with an active energy ray.

In the uncured resin layer forming step, if an anchor layer is formed on the substrate, the active energy ray curable resin composition may be coated on the anchor layer to form the uncured resin layer.

Examples of the anchor layer, which is not particularly limited and can be appropriately selected depending upon the purpose, include examples of the anchor layers described in the section where the anti-fogging laminate of the present invention is described.

<<Anti-Fogging Layer Forming Step>>

The anti-fogging layer forming step, which is not particularly limited and can be appropriately selected depending upon the purpose, so long as it is a step of irradiating to the uncured resin layer with an active energy ray and then curing the uncured resin layer to form an anti-fogging layer.

When the anti-fogging layer is formed, a physical processing for forming fine convex portions or fine concave portions on the surface is not performed.

When the active energy ray curable resin composition includes the hydrophobic monomer and the hydrophilic monomer, the low-surface-energy components are localized on the surface of the anti-fogging layer obtained, and the hydrophilic components (water-absorbable components) are present inside the anti-fogging layer. As a result, water droplets are easily repelled on the surface of the anti-fogging layer, and water moisture is easily trapped inside the anti-fogging layer, which makes it possible to achieve more excellent anti-fogging property.

—Active Energy Ray—

The active energy ray is not particularly limited and can be appropriately selected depending upon the purpose, as long as the uncured resin layer can be cured by the active energy ray. Examples of the active energy ray include those described in the section where the anti-fogging laminate of the present invention is described.

(Product)

The product of the present invention has the anti-fogging laminate of the present invention as a surface and further has other members as necessary.

Examples of the product, which is not particularly limited and can be appropriately selected depending upon the purpose, include glass windows, refrigerating/freezing show case, window materials for automobile windows, bath mirrors, mirrors such as automobile side mirrors, floors and walls of bath rooms, solar battery panels and security/surveillance cameras.

The product may be a pair of glasses, goggles, head-gears, lenses, microlens arrays, and headlight covers, front panels, side panels and rear panels of automobiles. These are preferably formed by in-mold forming, insert molding, or overlay molding.

The anti-fogging laminate may be used as a part or whole of the surface of the product.

A method for manufacturing the product is not particularly limited and can be appropriately selected depending upon the purpose; however, the method for manufacturing the product of the present invention (described later) is preferable.

(Method for Manufacturing the Product)

The method for manufacturing the product of the present invention includes at least a heating step, and an anti-fogging laminate molding step, and further includes other steps (injection molding step, cast molding step, etc.) if necessary.

The method for manufacturing the product is the method for manufacturing the product of the present invention.

<Heating Step>

The heating step is not particularly limited and can be appropriately selected depending upon the purpose as long as it is a step of heating an anti-fogging laminate.

The anti-fogging laminate is the anti-fogging laminate of the present invention.

The heating is not particularly limited and can be appropriately selected depending upon the purpose; however, infrared heating or exposure to a high temperature atmosphere is preferable.

The heating temperature is not particularly limited and can be appropriately selected depending upon the purpose; however, the heating temperature is preferably near the glass transition temperature of the substrate made of a resin or the glass transition temperature or more.

The heating time is not particularly limited and can be appropriately selected depending upon the purpose.

<Anti-Fogging Laminate Molding Step>

The anti-fogging laminate molding step is not particularly limited and can be appropriately selected depending upon the purpose as long as it is a step of molding the heated anti-fogging laminate into a desired shape. The anti-fogging laminate molding step is, for example, a step of bringing the laminate into contact with a predetermined mold and molding the laminate into a desired shape by application of air pressure.

<Injection Molding Step>

After the anti-fogging laminate molding step, an injection molding step may be performed as necessary.

The injection molding step is not particularly limited and can be appropriately selected depending upon the purpose as long as it is a step of injecting a molding material onto a substrate made of a resin of the anti-fogging laminate molded into a desired shape and molding the molding material.

As the molding material, for example, a resin is mentioned. Examples of the resin include olefin resins, styrene resins, ABS resins (acrylonitrile-butadiene-styrene copolymers), AS resins (acrylonitrile-styrene copolymers), acrylic resins, urethane resins, unsaturated polyester resins, epoxy resins, polyphenylene oxide/polystyrene resins, polycarbonates, polycarbonate modified polyphenylene ethers, polyethylene terephthalates, polysulfones, polyphenylene sulfides, polyphenylene oxides, polyetherimides, polyimides, polyamides, liquid crystal polyesters, polyallyl heat-resistant resins, various types of complex resins and various types of modified resins.

The injection method is not particularly limited and can be appropriately selected depending upon the purpose. The injection method, for example, a method of injecting a molten molding material to a substrate made of a resin of the anti-fogging laminate which is brought into contact with a predetermined die.

<Cast Molding Step>

After the anti-fogging laminate molding step, a cast molding step may be performed as necessary.

The cast molding step is not particularly limited and can be appropriately selected depending upon the purpose, so long as it is the following step. That is, resin materials dissolved in a solution are charged into a side of the substrate made of a resin of the anti-fogging laminate, which is molded into a desired shape. Then, the resin materials are solidified to perform the molding.

The method for manufacturing the product is preferably performed by use of an in-mold forming apparatus, an insert-molding apparatus, or an overlay molding apparatus.

Herein, an example of the method for manufacturing the product of the present invention will be described with reference to the accompanying drawings. The manufacturing method is a manufacturing method using an in-mold forming apparatus.

First, an anti-fogging laminate 500 is heated. The heating is preferably performed by infrared heating or exposure to a high temperature atmosphere.

Then, as shown in FIG. 1A, the anti-fogging laminate 500 heated is disposed at a predetermined position between a first mold 501 and a second mold 502 in such a manner that the substrate made of a resin of the anti-fogging laminate 500 faces the first mold 501; whereas the anti-fogging layer faces the second mold 502. In FIG. 1A, the first mold 501 is immovable; whereas the second mold 502 is movable.

Figure 1B:
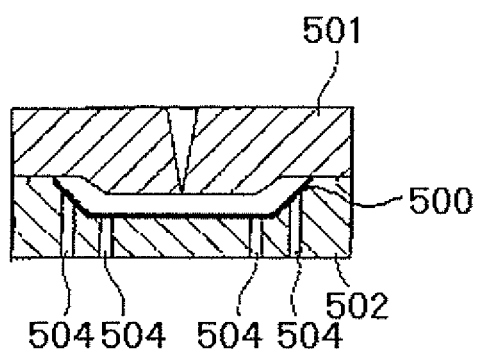
FIG. 1B is a process drawing for describing an example of manufacturing a product of the present invention by in-mold molding.

After the anti-fogging laminate 500 is disposed between the first mold 501 and the second mold 502, the first mold 501 and the second mold 502 are clamped. Subsequently, air is suctioned through a suction hole 504 having an opening in the cavity surface of the second mold 502 to fit the anti-fogging laminate 500 along the cavity surface of the second mold 502. In this manner, the cavity surface is shaped by the anti-fogging laminate 500. At this time, the periphery of the anti-fogging laminate 500 may be immobilized by a film fixation mechanism (not shown) to set the anti-fogging laminate. Thereafter, unnecessary portion of the anti-fogging laminate 500 is trimmed away (FIG. 1B).

Note that if the second mold 502 has no suction hole 504 and the first mold 501 has a hole (not shown), pressurized air is fed through the hole of the first mold 501 toward the anti-fogging laminate 500 to fit the anti-fogging laminate 500 along the cavity surface of the second mold 502.

Figure 1C:
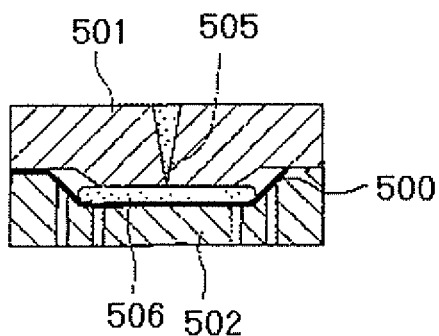
FIG. 1C is a process drawing for describing an example of manufacturing a product of the present invention by in-mold molding.
Figure 1D:
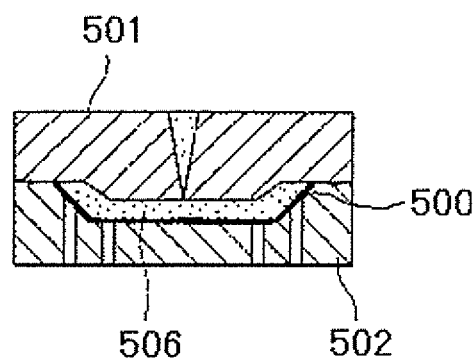
FIG. 1D is a process drawing for describing an example of manufacturing a product of the present invention by in-mold molding.

Subsequently, to the substrate made of a resin of the anti-fogging laminate 500, a molten molding material 506 is injected through a gate 505 of the first mold 501 and poured in the cavity, which is formed of the first mold 501 and the second mold 502 by clamping (FIG. 1C). In this manner, the cavity is charged with the molten molding material 506 (FIG. 1D). After completion of charge with the molten molding material 506, the molten molding material 506 is cooled to a predetermined temperature and solidified.

Figure 1E:
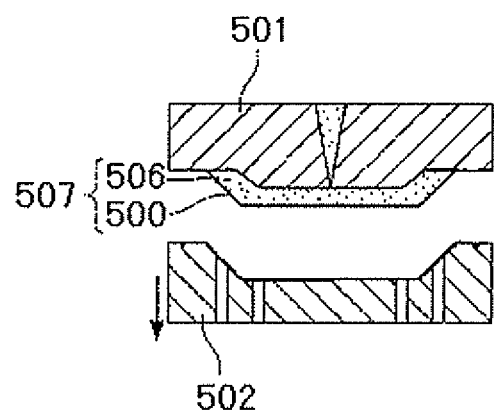
FIG. 1E is a process drawing for describing an example of manufacturing a product of the present invention by in-mold molding.
Figure 1F:
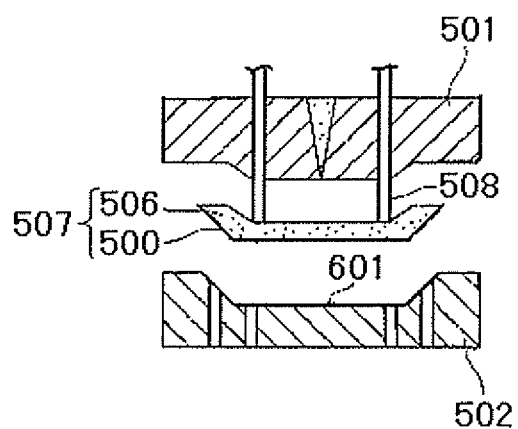
FIG. 1F is a process drawing for describing an example of manufacturing a product of the present invention by in-mold molding.

Thereafter, the second mold 502 is moved to separate the first mold 501 and the second mold 502 (FIG. 1E). In this manner, the anti-fogging laminate 500 is attached to the surface of the molding material 506 and a product 507 molded into a desired shape by in-mold forming can be obtained.

Finally, ejection pins 508 are pressed to remove the obtained product 507 from the first mold 501.

The manufacturing method using an overlay molding apparatus is as follows. This is a process of directly decorating the surface of a molding material with the anti-fogging laminate, and one example thereof is TOM (Three dimension Overlay Method). Next, one example of the method for manufacturing the product of the present invention using the TOM will be described.

First, both spaces of an apparatus that is partitioned by the anti-fogging laminate fixed in a fixing frame are vacuumed by sucking the air in the spaces with, for example, a vacuum pump.

At this time, a molding material previously formed by injection molding is placed in one of the spaces. At the same time, the anti-fogging laminate is heated with an infrared heater until the temperature reaches a predetermined temperature at which the anti-fogging laminate starts to soften. At the timing when the anti-fogging laminate has been heated to soften, the anti-fogging laminate is brought into contact with the three dimensional shape of the molding material under vacuum by feeding air into the space of the apparatus where the molding material is absent. If necessary, pressing with compressed air may further be employed in combination by feeding the compressed air to the space into which the air has been fed. After the anti-fogging laminate has been brought into contact with the molding product, the resultant decorated molding product is removed from the fixing frame. This vacuum molding is generally carried out at 80° C. to 200° C., preferably at about 110° C. to about 160° C.

Upon overlay molding, in order to achieve adhesion between the anti-fogging laminate and the molding material, an adhesive layer may be provided on the surface of the anti-fogging laminate opposite to the anti-fogging layer surface thereof. The adhesive layer is not particularly limited and can be appropriately selected depending upon the purpose. Examples of the adhesive layer include acrylic adhesives and hot-melt adhesives. The method for forming the adhesive layer is not particularly limited and can be appropriately selected depending upon the purpose. In one exemplary method for forming the adhesive layer, after the anti-fogging layer has been formed on the substrate made of a resin, a coating liquid for forming an adhesive layer is coated on the surface of the substrate made of a resin opposite to the surface thereof that has been provided with the anti-fogging layer, to thereby form the adhesive layer. In another employable method, a coating liquid for forming an adhesive layer is coated on a release sheet to form the adhesive layer, and then the substrate made of a resin and the adhesive layer on the release sheet are laminated on top of each other, to thereby laminate the adhesive layer on the substrate made of a resin.

Here, an example of the product of the present invention will be described with reference to the drawings.

FIG. 2 to FIG. 5 are each a schematic cross sectional view of an example of the product of the present invention.

Figure 2:
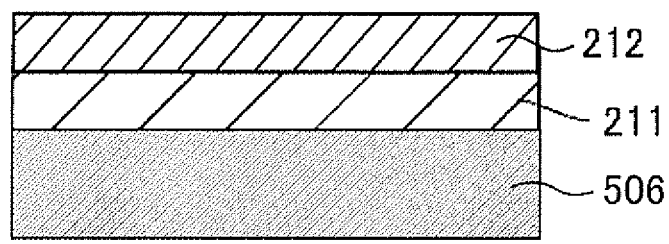
FIG. 2 is a schematic cross sectional view of an example of a product of the present invention (part 1)

The product of FIG. 2 includes a molding material 506, a substrate made of a resin 211, and an anti-fogging layer 212, where the substrate made of a resin 211 and the anti-fogging layer 212 are laminated on the molding material 506 in this order.

This product can be manufactured by, for example, insert molding.

Figure 3:
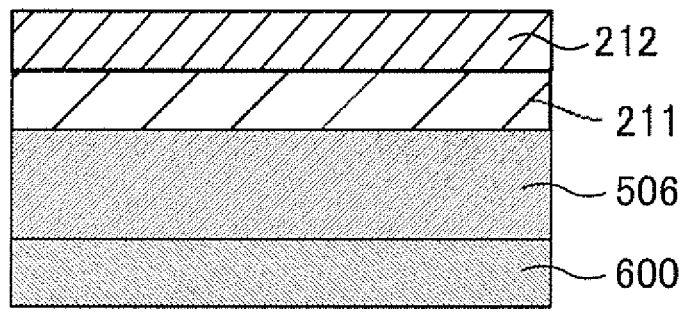
FIG. 3 is a schematic cross sectional view of an example of a product of the present invention (part 2)

The product of FIG. 3 includes a molding material 506, a substrate made of a resin 211, an anti-fogging layer 212, and a hard coat layer 600, where the substrate made of a resin 211 and the anti-fogging layer 212 are laminated on the molding material 506 in this order. The hard coat layer 600 is formed at the side of the molding material 506 opposite to the side where the substrate made of a resin 211 is present.

This product can be obtained by the following method. Specifically, after the product of FIG. 2 is manufactured, a protective layer is formed on an anti-fogging layer 212. Then, a molding material 506 is immersed in a hard coat solution and is subjected to, for example, drying and curing to form a hard coat layer 600 on the surface of the molding material 506. Then, the protective layer is removed to obtain the product. Note that, if the anti-fogging layer has a flat surface, and the pure water contact angle thereof is greater than 70° and the hexadecane contact angle thereof is greater than 35°, it is not necessary to form the protective layer. The reason for this is as follows. Specifically, the anti-fogging layer repels the hard coat solution. Therefore, the hard coat is not formed on the anti-fogging layer and the hard coat layer 600 is formed only on a side opposite to the side of the substrate made of a resin 211 of the molding material 506. Therefore, the product is excellent in productivity.

Figure 4:
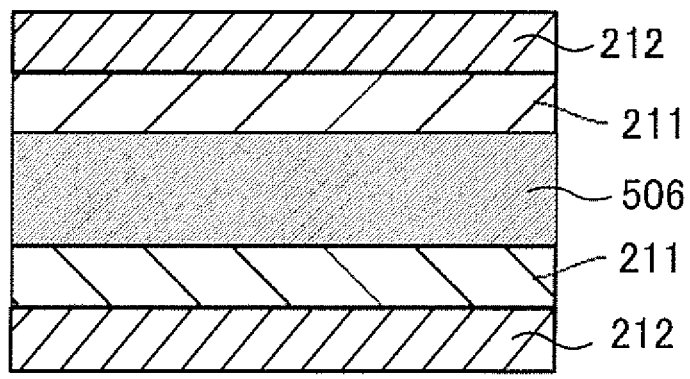
FIG. 4 is a schematic cross sectional view of an example of a product of the present invention (part 3)

The product of FIG. 4 includes a molding material 506, substrates made of a resin 211, and anti-fogging layers 212, where each of the substrates made of a resin 211 and each of the anti-fogging layers 212 are laminated on either side of the molding material 506 in this order.

Figure 5:
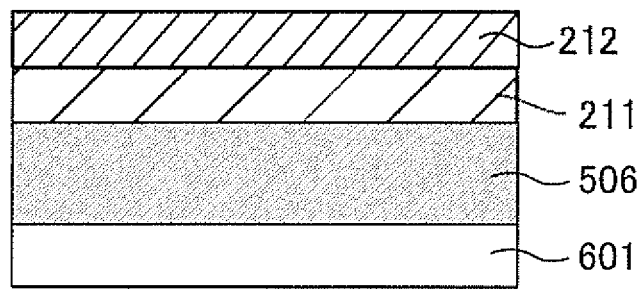
FIG. 5 is a schematic cross sectional view of an example of a product of the present invention (part 4)

The product of FIG. 5 includes a molding material 506, a substrate made of a resin 211, an anti-fogging layer 212, and an optical film 601, where the substrate made of a resin 211 and the anti-fogging layer 212 are laminated on the molding material 506 in this order. The optical film 601 is formed at the side of the molding material 506 opposite to the side where the substrate made of a resin 211 is present. Examples of the optical film 601 include a hard coat film, an anti-reflection film, an anti-glare film, and a polarizing film.

The product illustrated in FIG. 4 or FIG. 5 can be manufactured by, for example, double insert molding. Double insert molding is a method for molding a monolithic product with films laminated on both surfaces, and can be performed using, for example, the method described in Japanese Patent Application Laid-Open No. 03-114718.
(Anti-Fogging Method)
<Anti-Fogging Method (Part 1)>

One aspect of the anti-fogging method of the present invention is a method for preventing the product from fogging by laminating the anti-fogging laminate of the present invention onto the surface of a product.

Examples of the product, which is not particularly limited and can be appropriately selected depending upon the purpose, include glass windows, refrigerating/freezing show case, window materials for automobile windows, bath mirrors, mirrors such as automobile side mirrors, floors and walls of bath rooms, solar battery panels and security/surveillance cameras.

The product may be a pair of glasses, goggles, head-gears, lenses, microlens arrays, and headlight covers, front panels, side panels and rear panels of automobiles. These are preferably formed by in-mold forming and insert molding.

The method for laminating the anti-fogging laminate onto the surface of a product is not particularly limited and can be appropriately selected depending upon the purpose. For example, a method for attaching the anti-fogging laminate to a surface of the product is mentioned. The anti-fogging laminate can be laminated onto a surface of the product also by the method for manufacturing the product of the present invention.
<Anti-Fogging Method (Part 2)>

Another aspect of the anti-fogging method of the present invention is a method for preventing the anti-fogging layer from fogging by throwing water having a temperature of an ordinary temperature or higher on the anti-fogging layer, which has been fogged with steam, of the anti-fogging laminate.

In the anti-fogging laminate placed under a high humidity such as in a bathroom, the anti-fogging layer may fog with steam. However, the anti-fogging layer is defogged by throwing hot water thereon. Moreover, this anti-fogging effect is not temporary, but can be maintained for a long period of time (e.g., at least 30 min).

A temperature of the water (hot water) thrown on the anti-fogging layer in the anti-fogging method is not particularly limited and can be appropriately selected depending upon the purpose, as long as it is an ordinary temperature (25° C.) or higher. However, the temperature is preferably 30° C. or higher but 70° C. or lower, more preferably 35° C. or higher but 60° C. or lower, particularly preferably 35° C. or higher but 50° C. or lower.

In the anti-fogging method, a period of time for which the water is thrown on the anti-fogging layer is not particularly limited and can be appropriately selected depending upon the purpose, as long as the anti-fogging layer can be defogged. Even if the period of time is short, the anti-fogging effect is maintained as long as the anti-fogging layer is defogged.

A mechanism by which the anti-fogging effect is maintained for a long period of time in the anti-fogging method has not revealed, but water absorbency due to the hydrophilic molecular structure in the anti-fogging layer may be involved.

EXAMPLES

Now, Examples of the present invention will be described; however the present invention is not limited to these Examples.
<Elastic Recovery>

A durometer PICODENTOR HM500 (manufactured by Fischer Instruments) provided with a diamond pyramid penetrator (face angle: 136°) was used to apply the pressure to 1.0 mN/μm$^2$ at a loading rate of 0.050 mN/μm$^2$·sec for 20 sec at 25° C. and then unload the pressure to 0 at a unloading rate of 0.050 mN/μm$^2$·sec for 20 sec. Based on a hysteresis curve between load and deformation quantity during this period, plastic deformation workload (Wplast) and elastic deformation workload (Welast) were determined to thereby calculate the elastic recovery (%) at the predetermined pressure according to the following equation:

$$\text{Elastic recovery (\%)} = [W\text{elast}/(W\text{plast} + W\text{elast})] \times 100$$

The elastic recovery was measured at randomly selected 5 points, and the average value thereof was defined as the elastic recovery.
<Average Thickness>

The thickness of the anti-fogging layer was measured by observing a cross-section of the anti-fogging laminate with the electron emission type scanning electron microscope S-4700 (trade name; manufactured by Hitachi High-Technologies Corporation). The thickness is measured at randomly selected 5 points, and the average value thereof was defined as the average thickness.

<Coefficient of Dynamic Friction>

The coefficient of dynamic friction was measured using TRIBOSTER TS501 (trade name; manufactured by Kyowa Interface Science Co., Ltd.). BEMCOT (registered trademark) M-3II (trade name; manufactured by Asahi Kasei Corporation) was adhered to a surface contactor with a piece of double sided tape. The coefficient of dynamic friction was measured at randomly selected 12 points at a measuring load of 50 g/cm², a measuring rate of 1.7 mm/s, and a measuring distance of 20 mm, and the average value thereof was defined as the coefficient of dynamic friction.

<Anti-Fogging Property to Exhalation>

Immediately after the surface of the anti-fogging layer was strongly breathed once from a place 5 cm apart from the surface in the normal line direction under an environment of 25° C. and 37% RH, the surface was visually observed and evaluated according to the following evaluation criteria.

[Evaluation Criteria]

AA: There was no change in appearance of the surface of the anti-fogging layer.

A: Changes in appearance, such as white fog and formation of a film of water, were observed on a portion of the surface of the anti-fogging layer.

B: Changes in appearance, such as white fog and formation of a film of water, were observed on the entire of the surface of the anti-fogging layer.

<Scratch Resistance>

Steel wool (trade name: BONSTAR, count: #0000) was placed onto the surface of the anti-fogging layer and slid back and forth 10 times (slide stroke: 3 cm, slide rate: 6 cm/s) at a load of 400 gf/13 mm (diameter). Then, the surface was evaluated for appearance and the anti-fogging property to exhalation according to the following evaluation criteria.

<<Appearance>>

[Evaluation Criteria]

A: There was no change in appearance such as scratch and cloudiness.

B: Changes in appearance such as scratch and cloudiness were observed.

<<Anti-Fogging Property to Exhalation>>

[Evaluation Criteria]

A: The anti-fogging property to exhalation was not changed.

B: The anti-fogging property to exhalation was deteriorated.

<Anti-Fouling Property>

The surface of the anti-fogging layer was stained with SHARPIE PROFESSIONAL (black permanent marker, trade name, manufactured by Newell Rubbermaid). Then, the surface was wiped with a tissue (manufactured by DAIO PAPER CORPORATION, ELLEAIR) 10 times in a circular motion. Thereafter, the surface was visually observed and evaluated according to the following evaluation criteria.

[Evaluation Criteria]

A: The stains were removed.

B: The stains remained.

<Pure Water Contact Angle>

The pure water contact angle was measured using a contact angle meter, PCA-1 (manufactured by Kyowa Interface Science Co., Ltd.) in the following conditions. Distillation water was placed in a plastic syringe. To the tip of the syringe, a stainless steel needle was attached. The distillation water was allowed to drip on an evaluation surface (the anti-fogging layer surface).

The amount of water to be dripped: 2 µL

The measurement temperature: 25° C.

The contact angle 5 seconds after dripping of water was measured at randomly selected 10 points on the surface of the anti-fogging layer, and the average value thereof was defined as the pure water contact angle.

<Hexadecane Contact Angle>

The hexadecane contact angle was measured using a contact angle meter, PCA-1 (manufactured by Kyowa Interface Science Co., Ltd.) in the following conditions. Hexadecane is placed in a plastic syringe. To the tip of the syringe, a TEFLON coated stainless steel needle is attached. The hexadecane was allowed to drip on an evaluation surface (the anti-fogging layer surface).

The amount of hexadecane to be dripped: 1 µL

The measurement temperature: 25° C.

The contact angle 20 seconds after dripping of hexadecane was measured at randomly selected 10 points on the surface of the anti-fogging layer, and the average value thereof was defined as the hexadecane contact angle.

<Molding Process>

A produced anti-fogging laminate was heated through infra-red irradiation at 150° C. for 5 sec. Then, the anti-fogging laminate was molded into an 8 curve lens (diameter: 80 mm) so that a concave surface was the anti-fogging layer through vacuum pressure molding. Then, the anti-fogging laminate having an 8 curve lens (diameter: 80 mm) was subjected to punching with a Tomson blade. The mater that had undergone the punching was set to a mold for insert molding and the melted polycarbonate was loaded into the mold. The mold was cooled until polycarbonate was solidified. Then, the molds were separated to obtain an 8 curve lens where a concave surface of the lens was an anti-fogging layer.

<<Anti-Fogging Property to Exhalation after Molding Process>>

Immediately after the surface of the anti-fogging layer was strongly breathed once from a place 5 cm apart from the center of the lens in the normal line direction under an environment of 25° C. and 37% RH, the surface was visually observed and evaluated according to the following evaluation criteria.

[Evaluation Criteria]

AA: There was no change in appearance of the surface of the anti-fogging layer.

A: Changes in appearance, such as white fog and formation of a film of water, were observed on a portion of the surface of the anti-fogging layer.

B: Changes in appearance, such as white fog and formation of a film of water, were observed on the entire of the surface of the anti-fogging layer.

<Scratch Resistance after Molding Process>

Steel wool (trade name: BONSTAR, count: #0000) was placed onto a surface of the lens at the side where the anti-fogging layer is present and slid back and forth 10 times (slide stroke: 3 cm, slide rate: 6 cm/s) at a load of 400 gf/13 mm (diameter). Then, the surface was evaluated according to the following evaluation criteria.

[Evaluation Criteria]

A: There was no change in appearance and anti-fogging property to exhalation.

B: Changes in appearance such as scratch and cloudiness were observed and/or the anti-fogging property to exhalation was deteriorated.

<Adhesiveness>

A cross-cut adhesiveness test was performed according to JIS K5600-5-6 (cross-cut test method). The number of unpeeled squares out of 100 squares was counted.

The case in which all squares were unpeeled (100 squares out of 100 squares remained) is represented as "100/100"

and the case in which all squares were peeled (no square out of 100 squares remained) is represented as "0/100."

Note that, if any square was peeled, whether the peeling occurred between the glass and the anchor layer or between the anchor layer and the anti-fogging layer was also verified.

<Fogging Property with Steam>

Figure 6A:
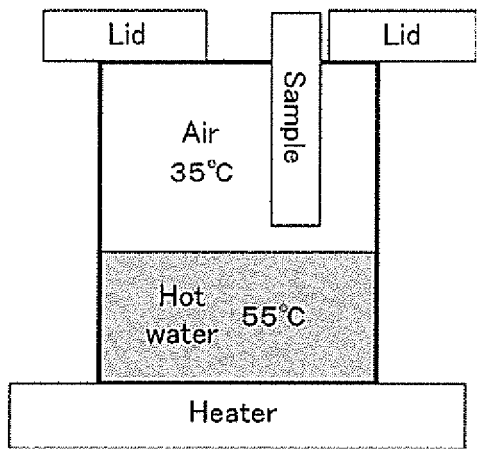
FIG. 6A is a schematic explanatory view of a method for testing a fogging property with steam.
Figure 6B:
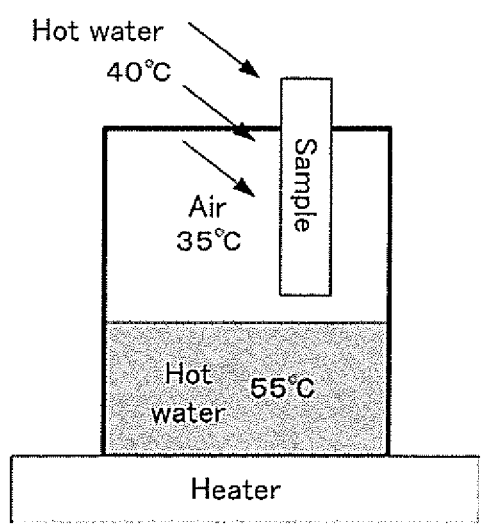
FIG. 6B is a schematic explanatory view of a method for testing a fogging property with steam.

A container was half-filled with water. The water was heated with a heater to keep at 55° C. and the air in an upper space of the container was kept at a temperature of 35° C. An anti-fogging laminate (sample) was set in the container so as not to contact with the water (hot water) (FIG. 6A). Hot water at about 40° C. was thrown on an anti-fogging layer of the anti-fogging laminate (sample) (FIG. 6B). Then, the state as depicted in FIG. 6A was restored. Thirty minutes after, the anti-fogging laminate (sample) was visually observed for fogging and evaluated according to the following evaluation criteria.

[Evaluation Criteria]

AA: There was no change in appearance on the surface of the anti-fogging layer.

A: Changes in appearance, such as white fog and formation of a film of water, were observed on a portion of the surface of the anti-fogging layer.

B: Changes in appearance, such as white fog and formation of a film of water, were observed on the entire of the surface of the anti-fogging layer.

Example 1

<Production of Anti-Fogging Laminate>

As the substrate made of resin, FE-2000 (PC substrate, average thickness: 180 μm, manufactured by MITSUBISHI GAS CHEMICAL COMPANY, INC.) was used.

Next, an active energy ray curable resin composition having the following composition was applied onto the substrate made of resin so that the average thickness after drying and curing was 10 μm. After applying, the composition was dried in an oven at 60° C. for 2 min. A metal halide lamp was used to emit an ultraviolet ray at a radiation dose of 500 mJ/cm$^2$ under nitrogen atmosphere and cure the resultant anti-fogging layer to obtain an anti-fogging laminate.

—Active Energy Ray Curable Resin Composition—
  SR9035 (manufactured by Sartomer Co.) 69.04 parts by mass
  EBECRYL 40 (manufactured by DAICEL-ALLNEX LTD.) 17.26 parts by mass
  OPTOOL DAC-HP (manufactured by DAIKIN INDUSTRIES, LTD) 4.5 parts by mass
  IRGACURE 184D (manufactured by BASF) 2.7 parts by mass
  Isopropyl alcohol 10 parts by mass The resultant anti-fogging laminate was subjected to the aforementioned evaluations. The results are presented in Table 1-1.

Example 2

An anti-fogging laminate was obtained in the same manner as in Example 1, except that an active energy ray curable resin composition having the following composition was used.

—Active Energy Ray Curable Resin Composition—
  SR9035 (manufactured by Sartomer Co.) 60.41 part by mass
  EBECRYL 40 (manufactured by DAICEL-ALLNEX LTD.) 25.89 parts by mass
  OPTOOL DAC-HP (manufactured by DAIKIN INDUSTRIES, LTD) 4.5 parts by mass
  IRGACURE 184D (manufactured by BASF) 2.7 parts by mass
  Isopropyl alcohol 10 parts by mass The resultant anti-fogging laminate was subjected to the aforementioned evaluations. The results are presented in Table 1-1.

Example 3

An anti-fogging laminate was obtained in the same manner as in Example 1, except that the average thickness of the anti-fogging layer after drying and curing was 5 μm.

The resultant anti-fogging laminate was subjected to the aforementioned evaluations. The results are presented in Table 1-1.

Comparative Example 1

An anti-fogging laminate was obtained in the same manner as in Example 1, except that an active energy ray curable resin composition having the following composition was used.

—Active Energy Ray Curable Resin Composition—
  SR9035 (manufactured by Sartomer Co.) 51.78 parts by mass
  EBECRYL 40 (manufactured by DAICEL-ALLNEX LTD.) 34.52 parts by mass
  OPTOOL DAC-HP (manufactured by DAIKIN INDUSTRIES, LTD) 4.5 parts by mass
  IRGACURE 184D (manufactured by BASF) 2.7 parts by mass
  Isopropyl alcohol 10 parts by mass The resultant anti-fogging laminate was subjected to the aforementioned evaluations. The results are presented in Table 1-1.

Comparative Example 2

An anti-fogging laminate was obtained in the same manner as in Example 2, except that the average thickness of the anti-fogging layer after drying and curing was 3 μm.

The resultant anti-fogging laminate was subjected to the aforementioned evaluations. The results are presented in Table 1-1.

Comparative Example 3

An anti-fogging laminate was obtained in the same manner as in Example 1, except that an active energy ray curable resin composition having the following composition was used.

—Active Energy Ray Curable Resin Composition—
  SR9035 (manufactured by Sartomer Co.) 69.04 parts by mass
  EBECRYL 40 (manufactured by DAICEL-ALLNEX LTD.) 17.26 parts by mass
  MEGAFAC RS-75 (manufactured by DIC Corporation) 2.25 parts by mass
  IRGACURE 184D (manufactured by BASF) 2.7 parts by mass
  Isopropyl alcohol 10 parts by mass The resultant anti-fogging laminate was subjected to the aforementioned evaluations. The results are presented in Table 1-2.

Example 4

An anti-fogging laminate was obtained in the same manner as in Example 1, except that an active energy ray curable resin composition having the following composition was used.

—Active Energy Ray Curable Resin Composition—
- SR9035 (manufactured by Sartomer Co.) 69.04 parts by mass
- EBECRYL 40 (manufactured by DAICEL-ALLNEX LTD.) 17.26 parts by mass
- BYK3500 (manufactured by BYK Japan KK) 1 part by mass
- IRGACURE 184D (manufactured by BASF) 2.7 parts by mass
- Isopropyl alcohol 10 parts by mass The resultant anti-fogging laminate was subjected to the aforementioned evaluations. The results are presented in Table 1-3.

Example 5

An anti-fogging laminate was obtained in the same manner as in Example 1, except that an active energy ray curable resin composition having the following to composition was used.

—Active Energy Ray Curable Resin Composition—
- SR415 (manufactured by Sartomer Co.) 69.04 parts by mass
- EBECRYL 40 (manufactured by DAICEL-ALLNEX LTD.) 17.26 parts by mass
- KY-1203 (manufactured by Shin-Etsu Chemical Co., Ltd.) 4.5 parts by mass
- IRGACURE 184D (manufactured by BASF) 2.7 parts by mass
- Isopropyl alcohol 10 parts by mass The resultant anti-fogging laminate was subjected to the aforementioned evaluations. The results are presented in Table 1-4.

Example 6

An anti-fogging laminate was obtained in the same manner as in Example 1, except that an active energy ray curable resin composition having the following composition was used.

—Active Energy Ray Curable Resin Composition—
- SR415 (manufactured by Sartomer Co.) 60.41 part by mass
- EBECRYL 40 (manufactured by DAICEL-ALLNEX LTD.) 25.89 parts by mass
- KY-1203 (manufactured by Shin-Etsu Chemical Co., Ltd.) 4.5 parts by mass
- IRGACURE 184D (manufactured by BASF) 2.7 parts by mass
- Isopropyl alcohol 10 parts by mass The resultant anti-fogging laminate was subjected to the aforementioned evaluations. The results are presented in Table 1-4.

Comparative Example 4

An anti-fogging laminate was obtained in the same manner as in Example 1, except that an active energy ray curable resin composition having the following composition was used.

—Active Energy Ray Curable Resin Composition—
- SR415 (manufactured by Sartomer Co.) 51.78 parts by mass
- EBECRYL 40 (manufactured by DAICEL-ALLNEX LTD.) 34.52 parts by mass
- KY-1203 (manufactured by Shin-Etsu Chemical Co., Ltd.) 4.5 parts by mass
- IRGACURE 184D (manufactured by BASF) 2.7 parts by mass
- Isopropyl alcohol 10 parts by mass The resultant anti-fogging laminate was subjected to the aforementioned evaluations. The results are presented in Table 1-4.

TABLE 1-1

| | | Ex. 1 | Ex. 2 | Ex. 3 | Comp. Ex. 1 | Comp. Ex. 2 |
|---|---|---|---|---|---|---|
| Composition (part(s) by mass) | SR9035 | 69.04 | 60.41 | 69.04 | 51.78 | 60.41 |
| | EB40 | 17.26 | 25.89 | 17.26 | 34.52 | 25.89 |
| | DAC-HP | 4.5 | 4.5 | 4.5 | 4.5 | 4.5 |
| | 184D | 2.7 | 2.7 | 2.7 | 2.7 | 2.7 |
| | IPA | 10 | 10 | 10 | 10 | 10 |
| Elastic recovery (%) | | 98 | 91 | 98 | 80 | 91 |
| Average thickness (µm) | | 10 | 10 | 5 | 10 | 3 |
| Coefficient of dynamic friction | | 0.37 | 0.37 | 0.37 | 0.37 | 0.37 |
| Anti-fogging property to exhalation | | AA | AA | AA | AA | AA |
| Scratch resistance | Appearance | A | A | A | B | B |
| | Anti-fogging property to exhalation | A | A | A | B | B |
| Anti-fouling property | | A | A | A | A | A |
| Pure water contact angle (°) | | 107 | 107 | 107 | 107 | 107 |
| Hexadecane contact angle (°) | | 67 | 67 | 67 | 67 | 67 |
| Anti-fogging property to exhalation after molding process | | AA | AA | AA | AA | AA |
| Scratch resistance after molding process | | A | A | A | B | B |

TABLE 1-2

| | | Comp. Ex. 3 |
|---|---|---|
| Composition (part(s) by mass) | SR9035 | 69.04 |
| | EB40 | 17.26 |
| | RS75 | 2.25 |
| | 184D | 2.7 |
| | IPA | 10 |
| Elastic recovery (%) | | 98 |
| Average thickness (µm) | | 10 |
| Coefficient of dynamic friction | | 0.56 |
| Anti-fogging property to exhalation | | AA |
| Scratch resistance | Appearance | B |
| | Anti-fogging property to exhalation | B |
| Anti-fouling property | | A |
| Pure water contact angle (°) | | 110 |
| Hexadecane contact angle (°) | | 62 |
| Anti-fogging property to exhalation after molding process | | AA |
| Scratch resistance after molding process | | B |

TABLE 1-3

|  |  | Ex. 4 |
|---|---|---|
| Composition (part(s) by mass) | SR9035 | 69.04 |
|  | EB40 | 17.26 |
|  | BYK3500 | 1 |
|  | 184D | 2.7 |
|  | IPA | 10 |
| Elastic recovery (%) |  | 98 |
| Average thickness (μm) |  | 10 |
| Coefficient of dynamic friction |  | 0.28 |
| Anti-fogging property to exhalation |  | AA |
| Scratch resistance | Appearance | A |
|  | Anti-fogging property to exhalation | A |
| Anti-fouling property |  | B |
| Pure water contact angle (°) |  | 70 |
| Hexadecane contact angle (°) |  | 35 |
| Anti-fogging property to exhalation after molding process |  | AA |
| Scratch resistance after molding process |  | A |

TABLE 1-4

|  |  | Ex. 5 | Ex. 6 | Comp. Ex. 4 |
|---|---|---|---|---|
| Composition (part(s) by mass) | SR415 | 69.04 | 60.41 | 51.78 |
|  | EB40 | 17.26 | 25.89 | 34.52 |
|  | KY-1203 | 4.5 | 4.5 | 4.5 |
|  | 184D | 2.7 | 2.7 | 2.7 |
|  | IPA | 10 | 10 | 10 |
| Elastic recovery (%) |  | 98 | 96 | 87 |
| Average thickness (μm) |  | 10 | 10 | 10 |
| Coefficient of dynamic friction |  | 0.17 | 0.14 | 0.17 |
| Anti-fogging property to exhalation |  | AA | AA | AA |
| Scratch resistance | Appearance | A | A | B |
|  | Anti-fogging property to exhalation | A | A | B |
| Anti-fouling property |  | A | A | A |
| Pure water contact angle (°) |  | 110 | 110 | 110 |
| Hexadecane contact angle (°) |  | 66 | 66 | 66 |
| Anti-fogging property to exhalation after molding process |  | AA | AA | AA |
| Scratch resistance after molding process |  | A | A | B |

Abbreviations or trade names described in Tables 1-1 to 1-4 are as follows.

SR9035: manufactured by Sartomer Co.
SR415: manufactured by Sartomer Co.
EB40: EBECRYL 40, manufactured by DAICEL-ALLNEX LTD.
DAC-HP: OPTOOL DAC-HP, manufactured by DAIKIN INDUSTRIES, LTD.
RS75: MEGAFAC RS-75, manufactured by DIC CORPORATION
BYK3500: manufactured by BYK Japan KK
KY-1203: manufactured by Shin-Etsu Chemical Co., Ltd.
184D: IRGACURE 184D, manufactured by BASF
IPA: isopropyl alcohol The anti-fogging layers having the elastic recovery of 90% or more, the average thickness of 4 lpm or more, and the coefficient of dynamic friction of 0.40 or less were able to achieve the durable anti-fogging property.

Comparative Examples 1 and 4 were poor in the scratch resistance because the anti-fogging layer thereof had the average thickness of 4 μm or more and the coefficient of dynamic friction of 0.40 or less, but had the elastic recovery of less than 90%.

Details of a mechanism by which the average thickness of the anti-fogging layer contributes to improvement of durability of the anti-fogging property is unclear at present, but it was found from Comparative Example 2 that, in order to improve the durability of the anti-fogging property, the average thickness of 4 μm or more of the anti-fogging layer was necessary in addition to the elastic recovery and the coefficient of dynamic friction.

Comparative Example 3 was poor in the scratch resistance because the anti-fogging layer thereof had the elastic recovery of 90% or more and the average thickness of 4 μm or more but had the coefficient of dynamic friction of more than 0.40.

It was found from Example 4 that the pure water contact angle of 70° or more and the hexadecane contact angle of 35° or more of the surface of the anti-fogging layer were preferable in order to additionally have a good anti-fouling property.

Example 7

<Production of Anti-Fogging Laminate>

As the substrate, a substrate made of glass (manufactured by Nippon Sheet Glass Co. Ltd., float plate glass, average thickness: 5 mm) was used.

The below-described resin composition for forming an anchor layer (1-1) was applied onto the substrate made of glass so that the average thickness after drying and curing was 1 μm. After applying, the composition was dried in an oven at 80° C. for 2 min. A high pressure mercury lamp was used to emit an ultraviolet ray at a radiation dose of 500 mJ/cm$^2$ under air atmosphere to obtain an anchor layer (ground layer).

—Resin Composition for Forming Anchor Layer (1-1)—
UT5181 (manufactured by The Nippon Synthetic Chemical Industry Co., Ltd.) 65.0 parts by mass
EBECRYL 40 (manufactured by DAICEL-ALLNEX LTD.) 35.0 parts by mass
IRGACURE 184D (manufactured by BASF) 3.0 parts by mass
PGME (propylene glycol monomethylether) 900 parts by mass Next, an active energy ray curable resin composition (2-1) having the following composition was applied onto the anchor layer so that the average thickness after drying and curing was 15 μm. After applying, the composition was dried in an oven at 80° C. for 2 min. A metal halide lamp was used to emit an ultraviolet ray at a radiation dose of 500 mJ/cm$^2$ under nitrogen atmosphere and cure the resultant anti-fogging layer to obtain an anti-fogging laminate.

—Active Energy Ray Curable Resin Composition (2-1)—
SR9035 (manufactured by Sartomer Co.) 69.04 parts by mass
EBECRYL 40 (manufactured by DAICEL-ALLNEX LTD.) 17.26 parts by mass
KY-1203 (manufactured by Shin-Etsu Chemical Co., Ltd.) 4.5 parts by mass
IRGACURE 184D (manufactured by BASF) 2.7 parts by mass
PGME (propylene glycol monomethylether) 10 parts by mass The resultant anti-fogging laminate was subjected to the aforementioned evaluations. The results are presented in Table 4-1.

Example 8

An anti-fogging laminate was obtained in the same manner as in Example 7, except that a resin composition for forming an anchor layer (1-2) having the following composition was used as the resin composition for forming an anchor layer.
—Resin Composition for Forming Anchor Layer (1-2)—
UT5181 (manufactured by The Nippon Synthetic Chemical Industry Co., Ltd.) 70.0 parts by mass
EBECRYL 40 (manufactured by DAICEL-ALLNEX LTD.) 30.0 parts by mass
IRGACURE 184D (manufactured by BASF) 3.0 parts by mass
PGME (propylene glycol monomethylether) 900 parts by mass The resultant anti-fogging laminate was subjected to the aforementioned evaluations. The results are presented in Table 4-1.

Example 9

An anti-fogging laminate was obtained in the same manner as in Example 7, except that a resin composition for forming an anchor layer (1-3) having the following composition was used as the resin composition for forming an anchor layer.
—Resin composition for forming anchor layer (1-3)—
UT5181 (manufactured by The Nippon Synthetic Chemical Industry Co., Ltd.) 85.0 parts by mass
EBECRYL 40 (manufactured by DAICEL-ALLNEX LTD.) 15.0 parts by mass
IRGACURE 184D (manufactured by BASF) 3.0 parts by mass
PGME (propylene glycol monomethylether) 900 parts by mass The resultant anti-fogging laminate was subjected to the aforementioned evaluations. The results are presented in Table 4-1.

Example 10

An anti-fogging laminate was obtained in the same manner as in Example 7, except that a resin composition for forming an anchor layer (1-4) having the following composition was used as the resin composition for forming an anchor layer.
—Resin Composition for Forming Anchor Layer (1-4)—
UT5181 (manufactured by The Nippon Synthetic Chemical Industry Co., Ltd.) 70.0 parts by mass
HEAA (manufactured by KJ Chemicals Corporation) 30.0 parts by mass
IRGACURE 184D (manufactured by BASF) 3.0 parts by mass
PGME (propylene glycol monomethylether) 900 parts by mass The resultant anti-fogging laminate was subjected to the aforementioned evaluations. The results are presented in Table 4-1.

Example 11

An anti-fogging laminate was obtained in the same manner as in Example 7, except that a resin composition for forming an anchor layer (1-5) having the following composition was used as the resin composition for forming an anchor layer.
—Resin Composition for Forming Anchor Layer (1-5)—
UT5181 (manufactured by The Nippon Synthetic Chemical Industry Co., Ltd.) 70.0 parts by mass
A-TMM-3L (manufactured by Shin Nakamura Chemical Co., Ltd.) 30.0 parts by mass
IRGACURE 184D (manufactured by BASF) 3.0 parts by mass
PGME (propylene glycol monomethylether) 900 parts by mass The resultant anti-fogging laminate was subjected to the aforementioned evaluations. The results are presented in Table 4-1.

Example 12

An anti-fogging laminate was obtained in the same manner as in Example 7, except that a resin composition for forming an anchor layer (1-6) having the following composition was used as the resin composition for forming an anchor layer.
—Resin Composition for Forming Anchor Layer (1-6)—
UT5181 (manufactured by The Nippon Synthetic Chemical Industry Co., Ltd.) 70.0 parts by mass
M3130 (manufactured by Miwon) 30.0 parts by mass
IRGACURE 184D (manufactured by BASF) 3.0 parts by mass
PGME (propylene glycol monomethylether) 900 parts by mass The resultant anti-fogging laminate was subjected to the aforementioned evaluations. The results are presented in Table 4-1.

Example 13

An anti-fogging laminate was obtained in the same manner as in Example 7, except that a resin composition for forming an anchor layer (1-7) having the following composition was used as the resin composition for forming an anchor layer.
—Resin Composition for Forming Anchor Layer (1-7)—
UT5181 (manufactured by The Nippon Synthetic Chemical Industry Co., Ltd.) 70.0 parts by mass
EBECRYL 40 (manufactured by DAICEL-ALLNEX LTD.) 25.0 parts by mass
KBM-503 (manufactured by Shin-Etsu Chemical Co., Ltd.) 5.0 parts by mass
IRGACURE 184D (manufactured by BASF) 3.0 parts by mass
PGME (propylene glycol monomethylether) 900 parts by mass The resultant anti-fogging laminate was subjected to the aforementioned evaluations. The results are presented in Table 4-1.

Example 14

An anti-fogging laminate was obtained in the same manner as in Example 8, except that the average thickness of the anchor layer was changed to 5 m.

The resultant anti-fogging laminate was subjected to the aforementioned evaluations. The results are presented in Table 4-2.

Example 15

An anti-fogging laminate was obtained in the same manner as in Example 8, except that an active energy ray curable resin composition (2-2) having the following composition was used as the active energy ray curable resin composition.

—Active energy ray curable resin composition (2-2)—
SR9035 (manufactured by Sartomer Co.) 60.41 part by mass
EBECRYL 40 (manufactured by DAICEL-ALLNEX LTD.) 25.89 parts by mass
KY-1203 (manufactured by Shin-Etsu Chemical Co., Ltd.) 4.5 parts by mass
IRGACURE 184D (manufactured by BASF) 2.7 parts by mass
PGME (propylene glycol monomethylether) 10 parts by mass The resultant anti-fogging laminate was subjected to the aforementioned evaluations. The results are presented in Table 4-2.

Example 16

An anti-fogging laminate was obtained in the same manner as in Example 8, except that an active energy ray curable resin composition (2-3) having the following composition was used as the active energy ray curable resin composition.

—Active Energy Ray Curable Resin Composition (2-3)—
SR9035 (manufactured by Sartomer Co.) 69.04 parts by mass
EBECRYL 40 (manufactured by DAICEL-ALLNEX LTD.) 17.26 parts by mass
OPTOOL DAC-HP (manufactured by DAIKIN INDUSTRIES, LTD) 4.5 parts by mass
IRGACURE 184D (manufactured by BASF) 2.7 parts by mass
PGME (propylene glycol monomethylether) 10 parts by mass The resultant anti-fogging laminate was subjected to the aforementioned evaluations. The results are presented in Table 4-2.

Example 17

An anti-fogging laminate was obtained in the same manner as in Example 8, except that an active energy ray curable resin composition (2-4) having the following composition was used as the active energy ray curable resin composition.

—Active Energy Ray Curable Resin Composition (2-4)—
SR9035 (manufactured by Sartomer Co.) 60.41 part by mass
EBECRYL 40 (manufactured by DAICEL-ALLNEX LTD.) 25.89 parts by mass
OPTOOL DAC-HP (manufactured by DAIKIN INDUSTRIES, LTD) 4.5 parts by mass
IRGACURE 184D (manufactured by BASF) 2.7 parts by mass
PGME (propylene glycol monomethylether) 10 parts by mass The resultant anti-fogging laminate was subjected to the aforementioned evaluations. The results are presented in Table 4-2.

Example 18

An anti-fogging laminate was obtained in the same manner as in Example 16, except that the average thickness of the anchor layer was changed to 5 μm.

The resultant anti-fogging laminate was subjected to the aforementioned evaluations. The results are presented in Table 4-2.

Example 19

An anti-fogging laminate was obtained in the same manner as in Example 7, except that a resin composition for forming an anchor layer (1-8) having the following composition was used as the resin composition for forming an anchor layer.

—Resin Composition for Forming Anchor Layer (1-8)—
UT5181 (manufactured by The Nippon Synthetic Chemical Industry Co., Ltd.) 90.0 parts by mass
EBECRYL 40 (manufactured by DAICEL-ALLNEX LTD.) 10.0 parts by mass
IRGACURE 184D (manufactured by BASF) 3.0 parts by mass
PGME (propylene glycol monomethylether) 900 parts by mass The resultant anti-fogging laminate was subjected to the aforementioned evaluations. The results are presented in Table 4-2.

Example 20

An anti-fogging laminate was obtained in the same manner as in Example 7, except that the average thickness of the anchor layer was changed to 0.1 μm.

The resultant anti-fogging laminate was subjected to the aforementioned evaluations. The results are presented in Table 4-2.

Example 21

An anti-fogging laminate was obtained in the same manner as in Example 8, except that an active energy ray curable resin composition (2-8) having the following composition was used as the active energy ray curable resin composition.

—Active Energy Ray Curable Resin Composition (2-8)—
SR9035 (manufactured by Sartomer Co.) 69.04 parts by mass
EBECRYL 40 (manufactured by DAICEL-ALLNEX LTD.) 17.26 parts by mass
BYK3500 (manufactured by BYK Japan KK) 1 part by mass
IRGACURE 184D (manufactured by BASF) 2.7 parts by mass
isopropyl alcohol 10 parts by mass The resultant anti-fogging laminate was subjected to the aforementioned evaluations. The results are presented in Table 4-3.

Comparative Example 5

An anti-fogging laminate was obtained in the same manner as in Example 8, except that an active energy ray curable resin composition (2-5) having the following composition was used as the active energy ray curable resin composition.

—Active Energy Ray Curable Resin Composition (2-5)—
SR9035 (manufactured by Sartomer Co.) 51.78 parts by mass
EBECRYL 40 (manufactured by DAICEL-ALLNEX LTD.) 34.52 parts by mass
KY-1203 (manufactured by Shin-Etsu Chemical Co., Ltd.) 4.5 parts by mass
IRGACURE 184D (manufactured by BASF) 2.7 parts by mass
PGME (propylene glycol monomethylether) 10 parts by mass The resultant anti-fogging laminate was subjected to the aforementioned evaluations. The results are presented in Table 4-3.

Comparative Example 6

An anti-fogging laminate was obtained in the same manner as in Example 8, except that an active energy ray curable resin composition (2-6) having the following composition was used as the active energy ray curable resin composition.
—Active Energy Ray Curable Resin Composition (2-6)—
  SR9035 (manufactured by Sartomer Co.) 51.78 parts by mass
  EBECRYL 40 (manufactured by DAICEL-ALLNEX LTD.) 34.52 parts by mass
  OPTOOL DAC-HP (manufactured by DAIKIN INDUSTRIES, LTD) 4.5 parts by mass
  IRGACURE 184D (manufactured by BASF) 2.7 parts by mass
  PGME (propylene glycol monomethylether) 10 parts by mass The resultant anti-fogging laminate was subjected to the aforementioned evaluations. The results are presented in Table 4-3.

Comparative Example 7

An anti-fogging laminate was obtained in the same manner as in Example 15, except that the average thickness of the anti-fogging layer after drying and curing was changed to 3 μm.

The resultant anti-fogging laminate was subjected to the aforementioned evaluations. The results are presented in Table 4-3.

Comparative Example 8

An anti-fogging laminate was obtained in the same manner as in Example 8, except that an active energy ray curable resin composition (2-7) having the following composition was used as the active energy ray curable resin composition.
—Active Energy Ray Curable Resin Composition (2-7)—
  SR9035 (manufactured by Sartomer Co.) 69.04 parts by mass
  EBECRYL 40 (manufactured by DAICEL-ALLNEX LTD.) 17.26 parts by mass
  MEGAFAC RS-75 (manufactured by DIC Corporation) 2.25 parts by mass
  IRGACURE 184D (manufactured by BASF) 2.7 parts by mass
  PGME (propylene glycol monomethylether) 10 parts by mass The resultant anti-fogging laminate was subjected to the aforementioned to evaluations. The results are presented in Table 4-3.

Referential Example 1

An anti-fogging laminate was obtained in the same manner as in Example 7, except that a resin composition for forming an anchor layer (1-9) having the following composition was used as the resin composition for forming an anchor layer.
—Resin Composition for Forming Anchor Layer (1-9)—
  UT5181 (manufactured by The Nippon Synthetic Chemical Industry Co., Ltd.) 60.0 parts by mass
  EBECRYL 40 (manufactured by DAICEL-ALLNEX LTD.) 40.0 parts by mass
  IRGACURE 184D (manufactured by BASF) 3.0 parts by mass
  PGME (propylene glycol monomethylether) 900 parts by mass The resultant anti-fogging laminate was subjected to the aforementioned evaluations. The results are presented in Table 4-3.

Referential Example 2

An anti-fogging laminate was obtained in the same manner as in Example 7, except that a resin composition for forming an anchor layer (1-10) having the following composition was used as the resin composition for forming an anchor layer.
—Resin Composition for Forming Anchor Layer (1-10)—
  UT5181 (manufactured by The Nippon Synthetic Chemical Industry Co., Ltd.) 70.0 parts by mass
  MIRAMER M300 (manufactured by Miwon) 30.0 parts by mass
  IRGACURE 184D (manufactured by BASF) 3 parts by mass
  PGME (propylene glycol monomethylether) 900 parts by mass The resultant anti-fogging laminate was subjected to the aforementioned to evaluations. The results are presented in Table 4-3.

Formulations of the resin compositions for forming anchor layers are summarized below.

TABLE 2

| Resin composition for forming anchor layer | | 1-1 | 1-2 | 1-3 | 1-4 | 1-5 | 1-6 | 1-7 | 1-8 | 1-9 | 1-10 |
|---|---|---|---|---|---|---|---|---|---|---|---|
| Composition (part(s) by mass) | UT-5181 | 65.0 | 70.0 | 85.0 | 70.0 | 70.0 | 70.0 | 70.0 | 90.0 | 60.0 | 70.0 |
| | EB40 | 35.0 | 30.0 | 15.0 | | | | 25.0 | 10.0 | 40.0 | |
| | HEAA | | | | 30.0 | | | | | | |
| | TMM3L | | | | | 30.0 | | | | | |
| | TMP(EO)3TA | | | | | | 30.0 | | | | |
| | TMPTA | | | | | | | | | | 30.0 |
| | KBM503 | | | | | | | 5.0 | | | |
| | Irg184D | 3.0 | 3.0 | 3.0 | 3.0 | 3.0 | 3.0 | 3.0 | 3.0 | 3.0 | 3.0 |
| | PGME | 900 | 900 | 900 | 900 | 900 | 900 | 900 | 900 | 900 | 900 |

UT-5181: UT5181 (manufactured by The Nippon Synthetic Chemical Industry Co., Ltd.), urethane acrylate EB40: EBECRYL 40 (manufactured by DAICEL-ALLNEX LTD.), pentaerythritol ethoxy tetraacrylate HEAA: HEAA (manufactured by KJ Chemicals Corporation), hydroxyethyl acrylate TMM3L: A-TMM-3L (manufactured by Shin Nakamura Chemical Co., Ltd.), pentaerythritol triacrylate TMP(EO)3TA: M3130 (manufactured by Miwon), trimethylolpropane ethoxy triacrylate TMPTA: MIRAMER M300 (manufactured by Miwon), trimethylolpropane triacrylate KBM503: KBM-503 (manufactured by Shin-Etsu Chemical Co., Ltd.)

Irg184D: IRGACURE 184D (manufactured by BASF)

Formulations of the active energy ray curable resin compositions used for producing the anti-fogging layers are summarized below.

TABLE 3

| Active energy ray curable resin composition | | 2-1 | 2-2 | 2-3 | 2-4 | 2-5 | 2-6 | 2-7 | 2-8 |
|---|---|---|---|---|---|---|---|---|---|
| Composition (part(s) by mass) | SR9035 | 69.04 | 60.41 | 69.04 | 60.41 | 51.78 | 51.78 | 69.04 | 69.04 |
| | EB40 | 17.26 | 25.89 | 17.26 | 25.89 | 34.52 | 34.52 | 17.26 | 17.26 |
| | KY-1203 | 4.5 | 4.5 | | | 4.5 | | | |
| | DAC-HP | | | 4.5 | 4.5 | | 4.5 | | |
| | RS75 | | | | | | | 2.25 | |
| | BYK3500 | | | | | | | | 1 |
| | 184D | 2.7 | 2.7 | 2.7 | 2.7 | 2.7 | 2.7 | 2.7 | 2.7 |
| | PGME | 10 | 10 | 10 | 10 | 10 | 10 | 10 | 10 |
| | Total | 103.5 | 103.5 | 103.5 | 103.5 | 103.5 | 103.5 | 101.25 | 100 |

TABLE 4-1

| | Example | | | | | | |
|---|---|---|---|---|---|---|---|
| | 7 | 8 | 9 | 10 | 11 | 12 | 13 |
| Resin composition for forming anchor layer | 1-1 | 1-2 | 1-3 | 1-4 | 1-5 | 1-6 | 1-7 |
| Active energy ray curable resin composition (anti-fogging layer) | 2-1 | 2-1 | 2-1 | 2-1 | 2-1 | 2-1 | 2-1 |
| Thickness of anchor layer (μm) | 1 | 1 | 1 | 1 | 1 | 1 | 1 |
| Thickness of anti-fogging layer (μm) | 15 | 15 | 15 | 15 | 15 | 15 | 15 |
| Adhesiveness  Between glass and anchor | 100/100 | 100/100 | 100/100 | 100/100 | 100/100 | 100/100 | 100/100 |
| Between anchor layer and anti-fogging layer | 100/100 | 100/100 | 100/100 | 100/100 | 100/100 | 100/100 | 100/100 |
| Elastic recovery (%) | 98 | 98 | 98 | 98 | 98 | 98 | 98 |
| Coefficient of dynamic friction | 0.17 | 0.17 | 0.17 | 0.17 | 0.17 | 0.17 | 0.17 |
| Scratch resistance  Appearance | A | A | A | A | A | A | A |
| Anti-fogging property to exhalation | A | A | A | A | A | A | A |
| Anti-fouling property | A | A | A | A | A | A | A |
| Pure water contact angle (°) | 110 | 110 | 110 | 110 | 110 | 110 | 110 |
| Hexadecane contact angle (°) | 66 | 66 | 66 | 66 | 66 | 66 | 66 |
| Anti-fogging property to exhalation | AA | AA | AA | AA | AA | AA | AA |
| Fogging property with steam | AA | AA | AA | AA | AA | AA | AA |

TABLE 4-2

| | Example | | | | | | | |
|---|---|---|---|---|---|---|---|---|
| | 14 | 15 | 16 | 17 | 18 | 19 | 20 | 21 |
| Resin composition for forming anchor layer | 1-2 | 1-2 | 1-2 | 1-2 | 1-2 | 1-8 | 1-1 | 1-2 |
| Active energy ray curable resin composition (anti-fogging layer) | 2-1 | 2-2 | 2-3 | 2-4 | 2-3 | 2-1 | 2-1 | 2-8 |
| Thickness of anchor layer (μm) | 5 | 1 | 1 | 1 | 1 | 1 | 0.1 | 1 |
| Thickness of anti-fogging layer (μm) | 15 | 15 | 15 | 15 | 5 | 15 | 25 | 15 |

TABLE 4-2-continued

|  |  | Example | | | | | | | |
|---|---|---|---|---|---|---|---|---|---|
|  |  | 14 | 15 | 16 | 17 | 18 | 19 | 20 | 21 |
| Adhesiveness | Between glass and anchor | 100/100 | 100/100 | 100/100 | 100/100 | 100/100 | 100/100 | 100/100 | 100/100 |
|  | Between anchor layer and anti-fogging layer | 100/100 | 100/100 | 100/100 | 100/100 | 100/100 | 50/100 | 0/100 | 100/100 |
| Elastic recovery (%) | | 98 | 96 | 98 | 91 | 98 | 98 | 98 | 98 |
| Coefficient of dynamic friction | | 0.17 | 0.14 | 0.37 | 0.37 | 0.37 | 0.17 | 0.17 | 0.28 |
| Scratch resistance | Appearance | A | A | A | A | A | A | A | A |
|  | Anti-fogging property to exhalation | A | A | A | A | A | A | A | A |
| Anti-fouling property | | A | A | A | A | A | A | A | B |
| Pure water contact angle (°) | | 110 | 110 | 107 | 107 | 107 | 110 | 110 | 70 |
| Hexadecane contact angle (°) | | 66 | 66 | 67 | 67 | 67 | 66 | 66 | 35 |
| Anti-fogging property to exhalation | | AA | AA | AA | AA | AA | AA | AA | AA |
| Fogging property with steam | | AA | AA | AA | AA | AA | AA | AA | AA |

TABLE 4-3

|  | Comparative Example | | | | Referential Example | |
|---|---|---|---|---|---|---|
|  | 5 | 6 | 7 | 8 | 1 | 2 |
| Resin composition for forming anchor layer | 1-2 | 1-2 | 1-2 | 1-2 | 1-9 | 1-10 |
| Active energy ray curable resin composition (anti-fogging layer) | 2-5 | 2-6 | 2-2 | 2-7 | 2-1 | 2-1 |
| Thickness of anchor layer (μm) | 1 | 1 | 1 | 1 | 1 | 1 |
| Thickness of anti-fogging layer (μm) | 15 | 15 | 3 | 15 | — | — |
| Adhesiveness Between glass and anchor | 100/100 | 100/100 | 100/100 | 100/100 | 0/100 | 0/100 |
| Between anchor layer and anti-fogging layer | 100/100 | 100/100 | 100/100 | 100/100 | — | — |
| Elastic recovery (%) | 87 | 80 | 91 | 98 | — | — |
| Coefficient of dynamic friction | 0.17 | 0.37 | 0.37 | 0.56 | — | — |
| Scratch resistance Appearance | B | B | B | B | — | — |
| Anti-fogging property to exhalation | B | B | B | B | — | — |
| Anti-fouling property | A | A | A | A | — | — |
| Pure water contact angle (°) | 110 | 107 | 107 | 110 | — | — |
| Hexadecane contact angle (°) | 66 | 67 | 67 | 62 | — | — |
| Anti-fogging property to exhalation | AA | AA | AA | AA | — | — |
| Fogging property with steam | AA | AA | B | AA | — | — |

The anti-fogging layer having the elastic recovery of 90% or more, the average thickness of 4 μm or more, and the coefficient of dynamic friction of 0.40 or less were able to achieve the durable anti-fogging property.

Comparative Examples 5 and 6 were poor in the scratch resistance because the anti-fogging layer thereof had the average thickness of 4 μm or more and the coefficient of dynamic friction of 0.40 or less, but had the elastic recovery of less than 90%.

Details of a mechanism by which the average thickness of the anti-fogging layer contributes to improvement of durability of the anti-fogging property is unclear at present, but it was found from Comparative Example 7 that, in order to improve the durability of the anti-fogging property, the average thickness of 4 μm or more of the anti-fogging layer was necessary in addition to the elastic recovery and the coefficient of dynamic friction.

Comparative Example 8 was poor in the scratch resistance because the anti-fogging layer thereof had the elastic recovery of 90% or more and the average thickness of 4 μm or more but had the coefficient of dynamic friction of more than 0.40.

It was found from Example 21 that the pure water contact angle of 70° or more and the hexadecane contact angle of 35° or more of the surface of the anti-fogging layer were preferable in order to additionally have a good anti-fouling property.

In the case where the substrate is the substrate made of glass, it is preferable from the viewpoint of improvement of adhesiveness between layers that the anchor layer be disposed between the substrate made of glass and the anti-fogging layer instead that the anti-fogging layer is directly formed on the substrate made of glass.

Comparing Example 20 with other examples, it was found that the average thickness of the anchor layer of 0.5 μm or more was preferable (Example 20).

Moreover, comparing Referential Examples 1 and 2 with Examples, it was found that the anchor layer meeting the following conditions (1) to (3) was preferable from the viewpoint of excellent adhesiveness between layers:

(1) the anchor layer is a cured product of an active energy ray curable resin composition;

(2) an active energy curable component in the active energy ray curable resin composition includes 65% by mass or more of urethane (meth)acrylate; and (3) the active energy curable component in the active energy ray curable resin composition includes at least one of an active energy curable component having a hydroxyl group and an active energy curable component having an ethylene oxide structure.

Moreover, comparing Example 19 with other examples, it was found that the anchor layer additionally meeting the following condition (4) was preferable from the viewpoint of more excellent adhesiveness between layers:

(4) the active energy curable component in the active energy ray curable resin composition includes 15% by mass or more of at least one of the active energy curable component having a hydroxyl group and the active energy curable component having an ethylene oxide structure.

Note that, Referential Examples 1 and 2 were not evaluated for, for example, the anti-fogging property because adhesiveness between the substrate made of glass and the anchor layer was poor.

INDUSTRIAL APPLICABILITY

The anti-fogging laminate of the present invention can be used by attaching to glass windows, refrigerating/freezing show case, window materials for automobile windows, bath mirrors, mirrors such as side automobile mirrors, floors and walls of bath rooms, solar battery panels, and security/surveillance cameras. Since the anti-fogging laminate of the present invention is easily molded and processed, the laminate can be used in a pair of glasses, goggles, head-gears, lenses, microlens arrays, and headlight covers, front panels, side panels and rear panels of automobiles by means of in-mold forming or insert molding.

REFERENCE SIGNS LIST 211 substrate made of a resin
212 anti-fogging layer

The invention claimed is:

1. An anti-fogging laminate comprising:
   a substrate; and
   an anti-fogging layer on the substrate where a surface of the anti-fogging layer is flat, such that the surface does not have any intentionally formed convex portions or concave portions,
   wherein the anti-fogging layer comprises a hydrophilic molecular structure; and
   wherein the anti-fogging layer has an elastic recovery of 90% or more, a coefficient of dynamic friction of 0.40 or less, and an average thickness of 4 μm or more.

2. The anti-fogging laminate according to claim 1, wherein the surface of the anti-fogging layer has a pure water contact angle of 70° or more and a hexadecane contact angle of 35° or more.

3. The anti-fogging laminate according to claim 1, wherein the anti-fogging layer comprises a hydrophobic molecular structure.

4. The anti-fogging laminate according to claim 1, wherein the anti-fogging laminate comprises an anchor layer disposed between the substrate and the anti-fogging layer.

5. The anti-fogging laminate according to claim 4, wherein the substrate is a substrate made of glass.

6. The anti-fogging laminate according to claim 4, wherein the anchor layer has an average thickness of 0.5 μm to 5 μm.

7. The anti-fogging laminate according to claim 4, wherein the anchor layer is a cured product of an active energy ray curable resin composition,
   wherein an active energy curable component in the active energy ray curable resin composition comprises 65% by mass or more of urethane (meth)acrylate and comprises at least one of an active energy curable component having a hydroxyl group and an active energy curable component having an ethylene oxide structure; and
   wherein the active energy ray curable resin composition comprises a photopolymerization initiator.

8. The anti-fogging laminate according to claim 7, wherein the active energy curable component in the active energy ray curable resin composition comprises 15% by mass or more of at least one of the active energy curable component having a hydroxyl group and the active energy curable component having an ethylene oxide structure.

9. A product comprising:
   the anti-fogging laminate according to claim 1 on a surface thereof.

10. A method for manufacturing the product according to claim 9, the method comprising:
    heating the anti-fogging laminate; and
    molding the anti-fogging laminate heated into a desired shape.

11. The method for manufacturing the product according to claim 10,
    wherein the heating is performed by infrared heating.

12. An anti-fogging method comprising:
    laminating the anti-fogging laminate according to claim 1 on a surface of a product to thereby prevent the product from fogging.

13. An anti-fogging method comprising:
    throwing water having a temperature of an ordinary temperature or higher on the anti-fogging layer, which has been fogged with steam, of the anti-fogging laminate according to claim 1 to thereby prevent the anti-fogging layer from fogging.

* * * * *